US009684859B2

(12) United States Patent
Mader et al.

(10) Patent No.: US 9,684,859 B2
(45) Date of Patent: Jun. 20, 2017

(54) REGISTRATION CORRECTION FOR CONTINUOUS PRINTING

(71) Applicant: Eastman Kodak Company, Rochester, NY (US)

(72) Inventors: Rodney Gene Mader, Sprinfield, OH (US); Brian L. Travis, Beaver Creek, OH (US); Michael Patrick Fink, Springboro, OH (US)

(73) Assignee: EASTMAN KODAK COMPANY, Rochester, NY (US)

(*) Notice: Subject to any disclaimer, the term of this patent is extended or adjusted under 35 U.S.C. 154(b) by 0 days.

(21) Appl. No.: 15/088,243

(22) Filed: Apr. 1, 2016

(65) Prior Publication Data

US 2017/0098143 A1 Apr. 6, 2017

Related U.S. Application Data

(60) Provisional application No. 62/237,695, filed on Oct. 6, 2015.

(51) Int. Cl.
| | |
|---|---|
| *G06K 15/00* | (2006.01) |
| *G06K 15/10* | (2006.01) |
| *G06K 15/02* | (2006.01) |
| *G06T 7/00* | (2017.01) |

(52) U.S. Cl.
CPC ......... *G06K 15/408* (2013.01); *G06K 15/022* (2013.01); *G06K 15/102* (2013.01); *G06T 7/001* (2013.01); *G06T 7/0006* (2013.01); *G06T 2207/10024* (2013.01); *G06T 2207/30144* (2013.01)

(58) Field of Classification Search
None
See application file for complete search history.

(56) References Cited

U.S. PATENT DOCUMENTS

| | | |
|---|---|---|
| 5,397,276 A | 3/1995 | Chang |
| 7,871,145 B1 | 1/2011 | Enge |
| 8,123,326 B2 | 2/2012 | Saettel et al. |
| 8,760,712 B2 | 6/2014 | Enge et al. |
| 8,845,059 B2 | 9/2014 | Enge et al. |
| 8,944,706 B2 | 2/2015 | Sakamoto et al. |
| 2006/0023060 A1* | 2/2006 | Towner .............. G02B 27/0031 347/259 |
| 2010/0053638 A1* | 3/2010 | Murayama ......... G03G 15/5058 356/620 |
| 2010/0053649 A1* | 3/2010 | Murayama ......... G03G 15/0194 358/1.9 |

(Continued)

*Primary Examiner* — Ming Hon
(74) *Attorney, Agent, or Firm* — Kevin E. Spaulding

(57) ABSTRACT

Image plane registration errors are corrected for a multi-channel printing system that prints on a continuous web of media. Nominal in-track line spacing are defined for each image plane, and are used to print lines of image data for each image plane. An in-track registration error is measured for a misregistered image plane in the printed image, and is used to determine an adjusted in-track line spacing that will bring the misregistered image plane back into registration in the in-track direction over a predefined correction time interval. Additional image data is then printed using the adjusted in-track line spacing during the correction time interval, after which image data is printed using a new in-track line spacing that is different from the adjusted in-track line spacing.

11 Claims, 15 Drawing Sheets

(56) References Cited

U.S. PATENT DOCUMENTS

| | | | |
|---|---|---|---|
| 2015/0055184 A1* | 2/2015 | Lin | H04N 1/405 358/3.06 |
| 2015/0116734 A1 | 4/2015 | Howard et al. | |
| 2015/0328905 A1* | 11/2015 | Regelsberger | B41J 11/04 347/104 |

* cited by examiner

REGISTRATION CORRECTION FOR CONTINUOUS PRINTING

CROSS REFERENCE TO RELATED APPLICATIONS

This application claims the benefit of U.S. Provisional No. 62/237,695, filed Oct. 6, 2015, which is incorporated herein by reference in its entirety.

FIELD OF THE INVENTION

This invention pertains to the field of digital printing, and more particularly to a method for adjusting the timing at which image data is printed.

BACKGROUND OF THE INVENTION

In a digitally-controlled printing system, a continuous web of print medium is directed through a series of components. For inkjet printing systems, as the print medium moves through the printing system, liquid, for example, ink, is applied to the print medium using one or more printheads. This is commonly referred to as jetting of the ink.

In commercial inkjet printing systems, the print medium is physically transported through the printing system at a high rate of speed. For example, the print medium can travel 650 to 1000 feet per minute. The printheads in commercial inkjet printing systems typically include multiple jetting modules that jet ink onto the print medium as the print medium is being physically moved through the printing system. A reservoir containing ink or some other material is typically positioned behind each nozzle plate in a printhead. The ink streams through the nozzles in the nozzle plates when the reservoirs are pressurized.

The jetting modules in each printhead in commercial printing systems typically jet only one color. Thus, when different colored inks are used to print color image content there is a generally a printhead for each colored ink. For example, there are four printheads in printing systems using cyan, magenta, yellow and black colored inks. The content is printed by jetting the colored inks sequentially. Each color of ink that is deposited on the print medium is known as a color plane or an image plane. The color planes need to be aligned, or registered with each other, so that the overlapping ink colors produce a quality multi-color image.

Conventionally, at the start of each document, registration corrections are made by shifting the start position of one or more image planes. Additionally adjustments can be made on a document by document basis to adjust the length and width of individual image plane to ensure that the widths and the lengths of the image planes match each other. The shifting of the start position of one or more image planes is an effective means for registering image planes for many documents, where there is an intervening non-printed gap between documents. However there are applications in which it is desirable to print multiple documents consecutively without have a non-print gap between documents. In such applications, a shifting of the start point between documents can lead to a visible artifact at the document seam that is undesirable.

There are several variables that contribute to the registration errors and to stitching errors including physical properties of the print medium, means of conveyance of the print medium, ink application system, ink coverage, and drying of ink. There is a need for improved methods to provide good color-to-color registration for applications in which it is desirable to print multiple documents without a non-print gap between documents.

SUMMARY OF THE INVENTION

The present invention represents a method for correcting image plane registration errors for a multi-channel printing system that prints on a continuous web of media using a plurality of printheads which each print lines of image data, includes:

receiving image data for a plurality of image planes;

defining a nominal in-track line spacing for each of the printheads;

printing the image data using the multi-channel printing system to provide a printed image on the web of media, wherein lines of image data for each image plane are printed using an associated printhead operating at its associated nominal in-track line spacing;

measuring an in-track registration error for a misregistered image plane in the printed image;

determining an adjusted in-track line spacing for the misregistered image plane responsive to the measured in-track registration error that will bring the misregistered image plane back into registration in the in-track direction over a predefined correction time interval; and printing additional image data using the multi-channel printing system, wherein:

during the correction time interval, lines of image data for the misregistered image plane are printed using the adjusted in-track line spacing; and after the correction time interval, lines of image data for the misregistered image plane are printed using a new in-track line spacing that is different from the adjusted in-track line spacing.

This invention has the advantage that registration errors can be corrected in continuous print applications without introducing artifacts such as discontinuities or gaps.

It has the additional advantage that registration errors can be corrected in the middle of a document page rather than waiting for the start of a new document page.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
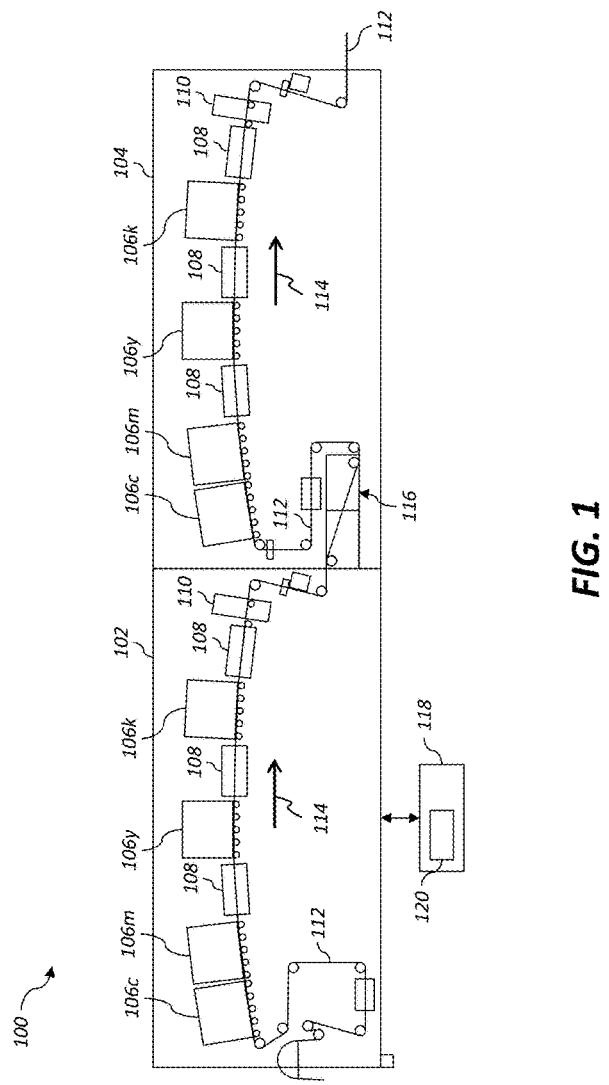
FIG. 1 is a schematic of a continuous web inkjet printing system.

The present description will be directed in particular to elements forming part of, or cooperating more directly with, apparatus in accordance with the present invention. It is to be understood that elements not specifically shown or described may take various forms well known to those skilled in the art.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the elements of the invention is not limiting. It should be noted that, unless otherwise explicitly noted or required by context, the word "or" is used in this disclosure in a non-exclusive sense.

Throughout the specification and claims, the following terms take the meanings explicitly associated herein, unless the context clearly dictates otherwise. Additionally, directional terms such as "on", "over", "top", "bottom", "left", "right" are used with reference to the orientation of the figure(s) being described. Because components of aspects of the present invention can be positioned in a number of different orientations, the directional terminology is used for purposes of illustration only and is in no way limiting. Where they are used, terms such as "first", "second", and so on, do not necessarily denote any ordinal or priority relation, but are simply used to more clearly distinguish one element from another.

As described herein, the example aspects of the present invention are applied to color plane registration in inkjet printing systems. However, many other applications are emerging which use inkjet jetting modules or similar nozzle arrays to emit fluids (other than inks) that need to be finely metered and deposited with high spatial precision. Such liquids include inks, both water-based and solvent-based, that include one or more dyes or pigments. These liquids also include various substrate coatings and treatments, various medicinal materials, and functional materials useful for forming, for example, various circuitry components or structural components. In addition, a nozzle array can jet out gaseous material or other fluids. As such, as described herein, the terms "liquid" and "ink" refer to any material that is ejected by a nozzle array. For simplicity and clarity of description, the invention will be described in terms of a multi-color inkjet printer. It must be understood that the invention similarly applies to other applications such as the printing of multiple layers of an electronic circuit where the individual circuit layers would correspond to an image plane in the color printer. In such applications, registration of the individual layers must be maintained for proper operation of the electronic circuit in a similar manner to the registration of the color image planes in the color prints. It is anticipated that many other applications may be developed in which the invention may be employed to enhance the registration of the image planes.

Inkjet printing is commonly used for printing on paper. However, printing can occur on any type of substrate or receiver medium. For example, the print medium can include vinyl sheets, plastic sheets, glass plates, textiles, paperboard, and corrugated cardboard. Additionally, although the term inkjet is often used to describe the printing process, the term jetting is also appropriate wherever ink or other fluid is applied in a consistent, metered fashion, particularly if the desired result is a thin layer or coating.

Inkjet printing is a non-contact application of an ink to a print medium. Typically, one of two types of ink jetting mechanisms are used and are categorized by technology as either drop-on-demand inkjet or continuous inkjet. The first technology, drop-on-demand inkjet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil it, forming a vapor bubble that creates enough internal pressure to eject an ink drop. This form of inkjet is commonly termed thermal inkjet.

The second technology, commonly referred to as continuous inkjet printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting drops so that printing drops reach the print medium and non-printing drops are caught by a collection mechanism. Various approaches for selectively deflecting drops have been developed including electrostatic deflection, air deflection, and thermal deflection.

The present invention described herein is applicable to both types of inkjet printing technologies. As such, the terms printhead and jetting module, as used herein, are intended to be generic and not specific to either technology. Additionally, the present invention described herein is applicable to a wide variety of types of print medium. As such, the terms print medium, and web, as used herein, are intended to be generic and not as specific to one type of print medium or web, or the way in which the print medium or web is moved through the printing system. Additionally, the terms printhead, jetting module, print medium, and web can be applied to other nontraditional inkjet applications, such as printing conductors on plastic sheets.

The terms "color plane" and "image plane" are used generically and interchangeably herein to refer to a portion of the data that is used to specify the location of features that are made by a particular printing station of a digitally controlled printing system on the print medium. Similarly, "color-to-color registration" is used generically herein to refer to the registration of such features that are made by different printing stations on the print medium. For color printing of images, the patterns of dots printed by different printheads in printing the same or different colors must be registered with each other to provide a high quality image. An example of a non-color printing application is functional printing of a circuit. The patterns of dots printed by different printheads, the image planes, form directly or serve as catalysts or masks for the formation of different layers of deposited materials such as conductive materials, semiconductor materials, resistive materials, insulating materials of various dielectric constants, high permeability magnetic materials, or other types of materials. In this case, the deposited materials must also be registered to provide a properly functioning circuit. The terms color plane and color-to-color registration can also be used herein to refer to the mapping and registration of pre-print or finishing operations, such as the mapping of where the folds or cutting or slitting lines are, or the placement of vias in an electrical circuit.

In some embodiments, printheads can include a plurality of jetting modules arranged across a width of the print medium. The term "print swath" corresponds to the portion of the printed image printed by a single jetting module during a single pass of the print medium past the jetting module. Adjacent print swaths are printed in a manner such that the transition between the swath printed by one jetting module and the print swath printed by another jetting module produces no visual discernable artifact. The process which enables this is referred to as stitching. Commonly-assigned U.S. Pat. No. 7,871,145 (Enge) discloses an effective method for stitching the print swaths together.

The terms "upstream" and "downstream" are terms of art referring to relative positions along the transport path of the print medium; the print medium moves along the transport path from upstream to downstream. In FIG. 1 print medium 112 moves through a printing system 100 in a direction indicated by in-track direction 114 (sometimes called the transport direction).

The schematic side view of FIG. 1 shows one example of a continuous web inkjet printing system 100. The printing system 100 includes a first printing module 102 and a second printing module 104, each of which includes a plurality of printheads 106c, 106m, 106y, 106k, and dryers 108, and a quality control sensor 110. Each printhead 106c, 106m, 106y, 106k typically includes multiple jetting modules (not shown in FIG. 1) that apply ink or another fluid (gas or liquid) to the surface of the print medium 112 that is adjacent to the jetting modules. In the illustrated configuration, each printhead 106c, 106m, 106y, 106k applies a different colored ink to the surface of the print medium 112. By way of example only, printhead 106c applies cyan colored ink, printhead 106m applies magenta colored ink, printhead 106y applies yellow colored ink, and printhead 106k applies black colored ink.

The printing system 100 also includes a web tension system that serves to physically move the print medium 112 through the printing system 100 in the in-track direction 114 (generally left-to-right as shown in the figure). The print medium 112 enters the first printing module 102 from a source roll (not shown) and the printheads 106c, 106m, 106y, 106k of the first printing module 102 apply ink to one side of the print medium 112. As the print medium 112 feeds into the second printing module 104, a turnover module 116 is adapted to invert or turn over the print medium 112 so that the printheads 106c, 106m, 106y, 106k of the second printing module 104 can apply ink to the other side of the print medium 112. The print medium 112 then exits the second printing module 104 and is collected by a print medium receiving unit (not shown).

A data processing system including one or more processors 118 can be connected to components in printing system 100 using any known wired or wireless communication connection. Processor 118 can be separate from printing system 100 or integrated within printing system 100 or within a component in printing system 100. Processor 118 can be a single processor, or can include one or more separate processors. Each of the one or more processors can be separate from the printing system 100 or integrated within the printing system 100. Processor 118 can be used to control various components of the printing system 100. For example, processor 118 can be connected to the printhead 106c, 106m, 106y, 106k and can control the printing of appropriate image data. Processor 118 can also be connected to various components in the web tension system and used to control the orientations of those components, such as gimbaled or caster rollers. Processor 118 can also be connected to the quality control sensor 110 and used to process images or data received from the quality control sensor 110.

One or more storage devices 120 are generally connected to the processor 118. The storage devices 120 can use any appropriate type of storage memory known in the art, and can store color plane correction values according to an aspect of the invention. The storage device 120 can also store image data and software used to process and print the image data in accordance with the present invention. The storage device 120 can be implemented as one or more external storage devices, one or more storage devices included within the processor 118, or a combination thereof. The storage device can include its own processor and can have memory accessible by the one or more processors 118.

Figure 2:
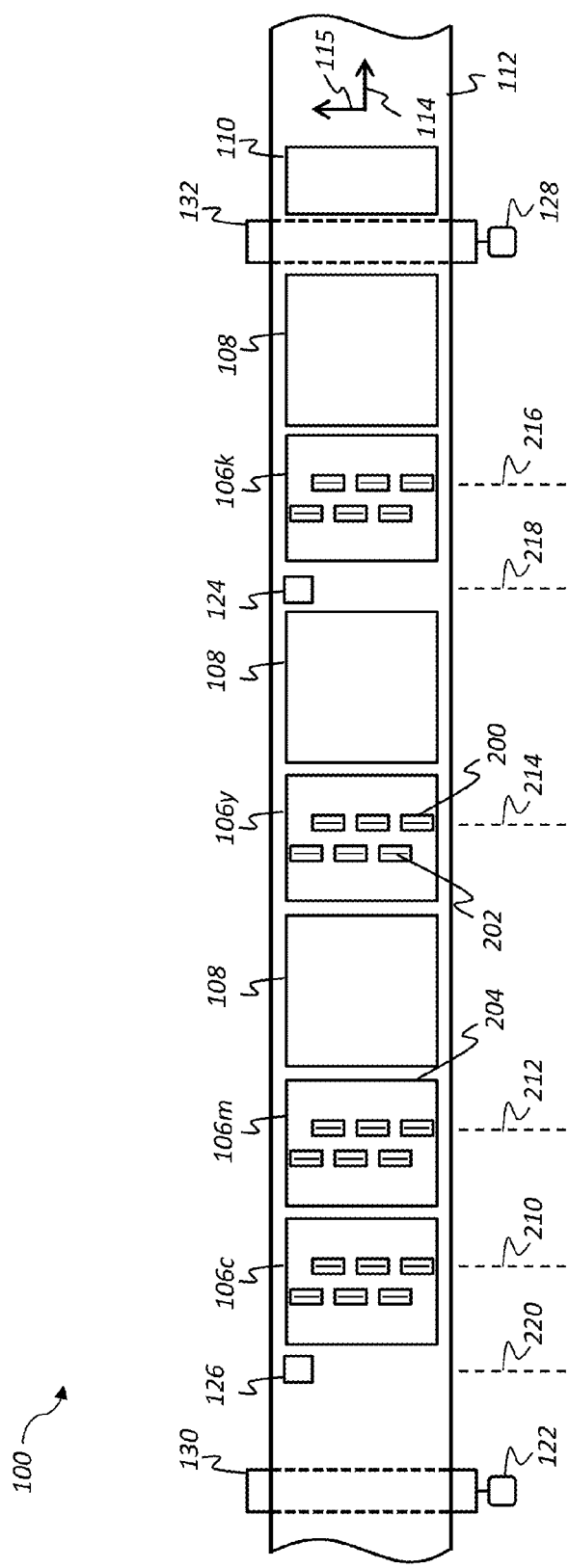
FIG. 2 is a schematic, showing additional details of a portion of the printing system of FIG. 1.

FIG. 2 illustrates a portion of printing system 100, showing additional details. As the print medium 112 is moved through printing system 100, the printheads 106c, 106m, 106y, 106k, which typically include a plurality of jetting modules 200 having nozzle arrays 202. The jetting modules 200 apply ink or another fluid onto the print medium 112 via the nozzle arrays 202. The jetting modules 200 within each printhead 106c, 106m, 106y, 106k are located and aligned by a support structure 204 in the illustrated configuration.

After the ink is jetted onto the print medium 112, the print medium 112 passes beneath the one or more dryers 108 which apply heat or air to the ink on the print medium 112. The operation of the printheads 106c, 106m, 106y, 106k is controlled by the processor 118 (FIG. 1) which receives signals related to the passage of the print medium 112 along the transport path from encoders 122, 128 (mounted on rollers 130, 132, respectively, in this example) and optionally from one or more cue sensors 124, 126. FIG. 2 also includes reference lines 210, 212, 214, 216, 218, 220 adjacent to the transport path of the print medium. Reference lines 210, 212, 214, 216 correspond to the locations along the transport path at which the printheads 106c, 106m, 106y, and 106k complete the printing of the first, second, third, and fourth image planes, respectively. Reference lines 218 and 220 correspond to the locations along the transport at which cue marks 320 (FIGS. 3-4) are detected by the cue sensors 124 and 126, respectively. In some embodiments, the cue sensors 124, 126 may only be used during an initialization process to establish a starting position for the image planes, or may not be used at all.

Figure 3:
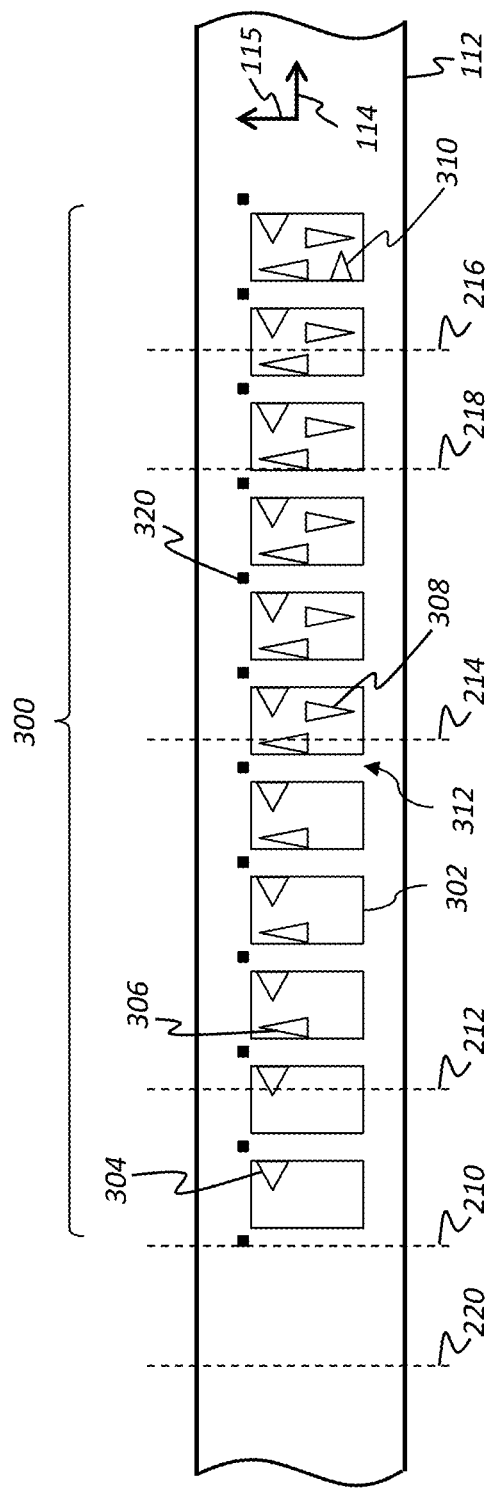
FIG. 3 illustrates a portion of a print job including a number of documents.

FIG. 3 illustrates the sequential nature of the printing of image planes 304, 306, 308, 310 for document pages 302 of a print job 300 on print medium 112 as it moves along the transport path in in-track direction 114. In this example, the document pages 302 are separated by intervening unprinted gaps 312. In some embodiments, pre-printed cue marks 320 on the print medium 112 can be detected by cue sensors 124, 126 (FIG. 2) at locations denoted by reference lines 218, 220, respectively. On print medium 112 lacking cue marks 320, the cue marks 320 can be printed by the first printhead 106c at locations defined by a virtual cue. The virtual cue is a signal generated by the processor 118 (FIG. 1), typically at defined cue intervals counted out in encoder pulses. The cue interval for the virtual cue is typically defined so that the cue marks 320 printed by the first printhead 106c are spaced out slightly longer than the length of the document pages 302 to be printed.

First image plane 304 (e.g., cyan) is printed by the first printhead 106c at a desired location on the print medium 112 (e.g., relative to an associated cue mark 320) as the print medium 112 passes the first printhead 106c (FIG. 2), whose location corresponds to reference line 210. As the print medium 112 proceeds down the transport path and passes the second printhead 106m (FIG. 2), whose location corresponds to reference line 212, second image plane 306 (e.g., magenta) is printed on the print medium 112. Likewise, third image plane 308 (e.g., yellow) is printed on the print medium 112 as it passes the third printhead 106y (FIG. 2), whose location corresponds to reference line 214, and a fourth image plane 310 (e.g., black) is printed on the print medium 112 as it passes the fourth printhead 106k (FIG. 2), whose location corresponds to reference line 216.

Returning to a discussion of FIG. 2, as the print medium 112 moves along the transport path its position is monitored to enable the processor 118 (FIG. 1), also known as a control system, to control the operation of the printheads 106c, 106m, 106y, 106k so that the image planes 304, 306, 308, 310 (FIG. 3) can be properly registered. Encoder 122 is used to monitor and provide an indication of the position of the print medium 112 as it passes along the transport path. In an exemplary configuration, the encoder 122 is a rotary encoder attached to a roller 130 over which the print medium 112 rolls. Such rotary encoders produce a defined number of electronic pulses per revolution of the roller 130. Through the appropriate selection of the attached roller diameter, such encoders 122 produce a predefined number of encoder pulses per print line spacing. A counting of encoder pulses as the print medium 112 moves through the printing module enables the processor 118 (FIG. 1) to track the motion of the print medium 112 as it passes along the transport path past the printheads 106c, 106m, 106y, 106k. It has been common therefore to delay the printing of the image data for the downstream printheads 106m, 106y, 106k relative to the most upstream printhead 106c by a number of encoder pulses that corresponds to the transport path spacing between the upstream printhead 106c and the downstream printheads 106m, 106y, 106k. For example, if the second printhead 106m is spaced 15 inches downstream of the first printhead 106c, and the encoder 122 produces 1000 pulses per inch of travel, then a 15×1000=15,000 encoder pulse delay would be applied for printing the image data for the second image plane 306 with the second printhead 106m relative to the printing of the corresponding image data for the first image plane 304 with the first printhead 106c.

As the print job 300 (FIG. 3) is printed, the print medium 112 can receive varying amounts of ink during printing depending on the image content of the document pages 302. In turn, the aqueous component of the ink is absorbed into the print medium 112 and can cause the print medium 112 to swell and stretch, especially with water-based inks in high ink laydown regions of the printed image content, and if the print medium 112 is under tension. Stretch can be higher in the direction of movement (i.e., the in-track direction 114) than in cross-track direction 115. Ink dryers 108 along the transport path then remove moisture from the print medium 112 causing the print medium 112 to shrink. When the print medium 112 is heated in between printheads 106m, 106y, 106k, regions of the print medium 112 can be stretched and shrunk one or more times as the print medium 112 moves through the printing system 100.

As the print medium 112 undergoes stretch or shrinkage in the in-track direction 114, the number of encoder pulses required for a point on the print medium 112 to move from the first printhead 106c to one of the downstream printheads 106m, 106y, 106k can deviate from its nominal value. This can cause the image planes 306, 308, 310 printed by the printheads 106m, 106y, 106k to be misregistered relative to the image plane 304 printed by the first printhead 106c. Such misregistration can produce a loss of alignment between the color planes and can lead to image quality losses due to artifacts such as blurry content, color fringes and hue degradation. In high speed inkjet printers, the spacing of the printheads 106c, 106m, 106y, 106k along the transport path can become quite large, such as the distance of 3.6 meters between the first printhead 106c and the fourth printhead 106k in the Kodak® Prosper® 6000 printer. With such a large distance, even a small fractional change in length of the print medium 112 can result in registration shifts of many pixels between the image planes 304, 310 printed by the first and last printheads 106c, 106k. Additionally, printing on both sides of the print medium 112 usually requires front-to-back registration, and the second side of the print medium 112 is usually printed significantly downstream of the first side.

With reference to FIGS. 2-3, to overcome this problem, some printing systems 100 time the printing of the document pages 302 by some or all of the printheads 106c, 106m, 106y, 106k based on the detection of a cue mark 320 printed on the print medium 112 by a cue sensor 124 associated with the printhead 106c, 106m, 106y, 106k. For example, the print timing of printhead 106k can be controlled relative to the detection of a cue mark 320 on the print medium 112 by cue sensor 124, which is located slightly upstream of the printhead 106k. Printhead 106k begins the printing of image plane 310 of document page 302 at an appropriate encoder pulse count delay, sometimes referred to as cue delay or a registration encoder pulse count delay, from the cue pulse signaling the detection of cue mark 320 by the cue sensor 124. The cue delay depends in part on the distance between the cue sensor and the associated printhead 106k. As this distance is much smaller than the distance between the first printhead 106c and the last printhead 106k, this process is much less sensitive to in-track dimensional changes of the print medium 112 than systems that control the print timing of the printhead 106k based on the detection of a cue mark 320 by the upstream cue sensor 126 or on the print time of the most upstream printhead 106c. In the configuration of FIG. 2, only two cue sensors 124, 126 are used for each printing module. The printheads 106c, 106m, which print cyan and magenta respectively, receive their cue signals from cue sensor 126, and the printheads 106y, 106k, which print yellow and black respectively, receive their cue signals from cue sensor 124. In alternate configurations, additional cue sensors can also be positioned along the transport path upstream of printheads 106m and 106y so that each printhead 106c, 106m, 106y, 106k can be controlled based on a cue signal from an associated cue sensor located in close proximity.

Due to differences in print medium moisture levels and differences in tension along the media path in the print zone, the in-track length of the image planes 304, 306, 308, 310 printed by the different printheads 106c, 106m, 106y, 106k can differ. Even if the image planes 304, 306, 308, 310 of a document page 302 are registered at the leading edge of the document page 302, such differences in the in-track length of the image planes 304, 306, 308, 310 can lead to visible in-track registration errors at the trailing edge of the document page 302. To reduce such in-track length variations between the image planes 304, 306, 308, 310, some printing systems 100 use an in-track magnification correction to stretch or shrink the in-track line spacing of rows of pixels of an image plane 304, 306, 308, 310, and thereby stretch or shrink the image planes 304, 306, 308, 310 in the in-track direction 114 so that the in-track length of the adjusted image plane matches the length of a reference image plane for each document page 302.

Figure 4:
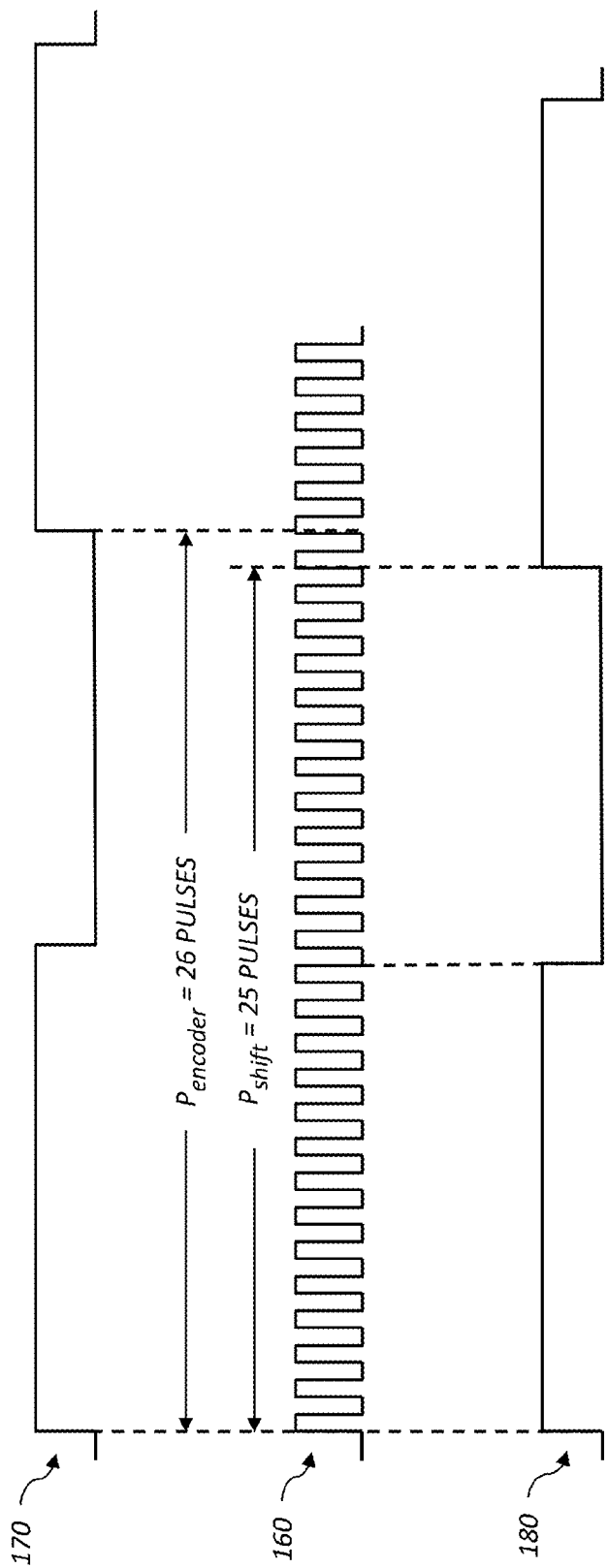
FIG. 4 is a diagram illustrating a frequency shifted pulse stream.

In-track length corrections (also called in-track magnification adjustments) can be carried out by frequency shifting the encoder pulse stream used to control the print timing of one or more of the printheads 106c, 106m, 106y, 106k. An exemplary process for frequency shifting the encoder pulse stream is disclosed in commonly-assigned U.S. Pat. No. 8,123,326 (Saettel et al.) which is incorporated herein by reference. This method is illustrated in FIG. 4. A clock pulse stream 160 is generated by a system clock, which maintains a constant pulse frequency so that other components of the system can have a timing mechanism. The top pulse stream is an encoder pulse stream 170 from the encoder 122 (FIG. 2). The encoder period, or time between pulses, $P_{encoder}$, can be measured by counting the number of system clock pulses in the clock pulse stream 160 (either the number of rising or falling edges) between pulses. In this example, the period is measured from one rising edge of the encoder pulse stream 170 to the next to yield a count of $P_{encoder}$=26 system clock pulses of the clock pulse stream 160. If the encoder pulses in the encoder pulse stream 170 have a 50% duty cycle, where pulse high time equals the pulse low time, the number of system clock pulses between rising and falling edges of the pulses gives a measurement of half the pulse period. (In practice it is desirable to average together several measurements of the period to reduce the counting statistic noise.)

A new frequency-shifted pulse stream 180 is then created with a new frequency-shifted period, $P_{shift}$, which is equal to the measured period multiplied by a correction factor that is based on the determined in-track magnification error factor (CF): $P_{shift}=P_{encoder}*CF$. In this example, a correction factor CF of 0.96 yields a period for the frequency-shifted pulse stream 180 of $P_{shift}$=26×0.96=25 system clock pulses. The frequency-shifted pulse stream 180 can then be created by forming pulses that are separated by 25 system clock pulses. This change will decrease slightly the in-track line spacing of the printed pixels. Due to this decreased in-track line spacing, the adjusted image plane of a document page 302 will gradually shift relative to a non-adjusted image plane. If no in-track magnification correction is required, the magnification correction factor (CF) is set equal to 1.0 so that the frequency-shifted period $P_{shift}$ of the frequency-shifted pulse stream 180 is equal to the encoder period $P_{encoder}$ of the encoder pulse stream 170. To reduce errors produced by noise or jitter in the measurement of the encoder period $P_{encoder}$, the value of $P_{encoder}$ can be an average value determined by averaging several measurements of the period.

While one method for adjusting the in-track magnification described is described above, other electronic or mechanical means can alternatively be used, including the use of pulleys as described in U.S. Pat. No. 5,397,276 (Chang), or various forms of continuously variable transmission between a roller in contact with the print medium and an encoder.

Cross-track registration errors and magnification errors can also be corrected using a variety of methods. In some embodiments, cross-track registration errors can be corrected by adjusting which inkjet nozzles are used to print the image data in order to apply cross-track image plane shifts. For example, the image data supplied to the printheads 106c, 106m, 106y, 106k can be shifted left or right to use different subsets of the nozzles in the printheads 106c, 106m, 106y, 106k. In other embodiments, a servo-system can be used to adjust a cross-track position of the print medium 112 relative to the printheads to apply the cross-track image plane shifts.

In some embodiments, cross-track magnification changes can be applied using the methods described in commonly-assigned U.S. Pat. No. 8,760,712 (Enge et al.) and commonly-assigned, U.S. Pat. No. 8,845,059 (Enge et al.) each of which is incorporated herein by reference. These methods involves inserting or deleting image pixels across the width of the printheads 106c, 106m, 106y, 106k to adjust the size of the printed image in the cross-track direction 115.

In the exemplary configuration of FIG. 3 there are unprinted gaps 312 between the document pages 302. The unprinted gaps 312 provide convenient intervals for performing registration corrections so that the leading edges of the image planes 304, 306, 308, 310 are properly aligned. For example, as discussed above, cue marks can be used in conjunction with one or more cue sensors to control the start of each image plane 304, 306, 308, 310 to keep them registered.

Figure 5:
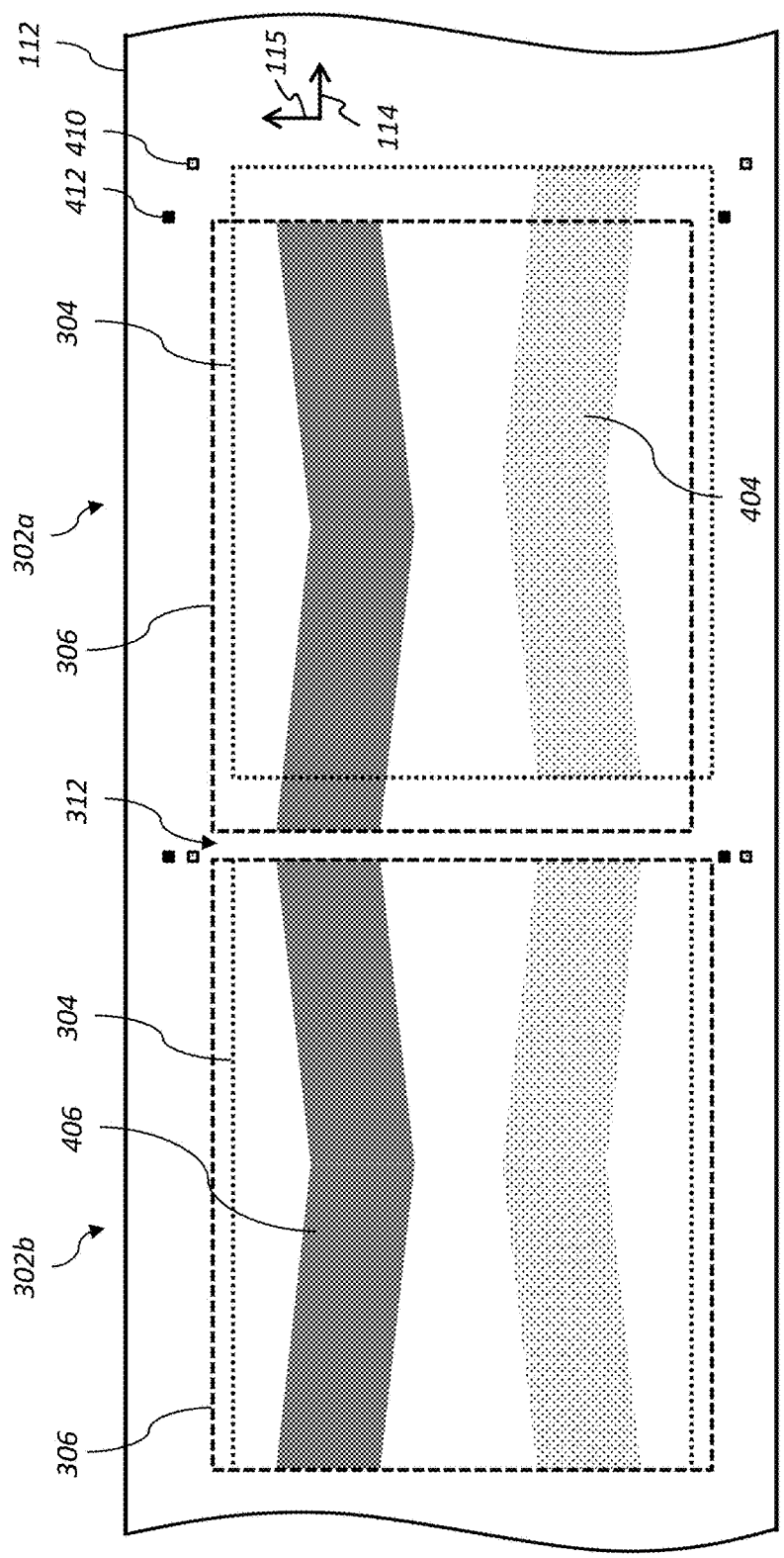
FIG. 5 illustrates in-track registration adjustment of two image planes of a portion of a print job including documents separated by intervening gaps.

FIG. 5 shows a portion of a printed print medium 112 having two image planes 304, 306 for two consecutive document pages 302a, 302b. In this example, image plane 304 is designated to be a reference image plane, and image plane 306 is designated to be a non-reference image plane. Pattern 404 corresponds to the image content of the reference image plane 304, and pattern 406 corresponds to the image content of the non-reference image plane 306. In this example, the document pages 302a, 302b are printed with unprinted gaps 312 between consecutive documents pages 302a, 302b. The print medium 112 is moving from left to right in in-track direction 114. The first document page 302a (i.e., the right-hand page) is shown with misregistration errors in both the in-track direction 114 and the cross-track direction 115. (In the following examples, the cross-track registration errors will be left uncorrected to enable the separate image planes 304, 306 to be more clearly identified.) In this example, image plane 304 serves as the reference image plane relative to which the registration of the non-reference image plane 306 is measured. Upon detection of the registration error (e.g., by detecting the positions of registration marks 410, 412 printed in association with the first document page 302a), the cue delay of the non-reference image plane 306 of the second document page 302b (i.e., the left-hand page) is reduced to shift the non-reference image plane 306 forward into the correct in-track position so that it is properly registered with respect to the reference image plane 304 in the second document page 302b.

Figure 6:
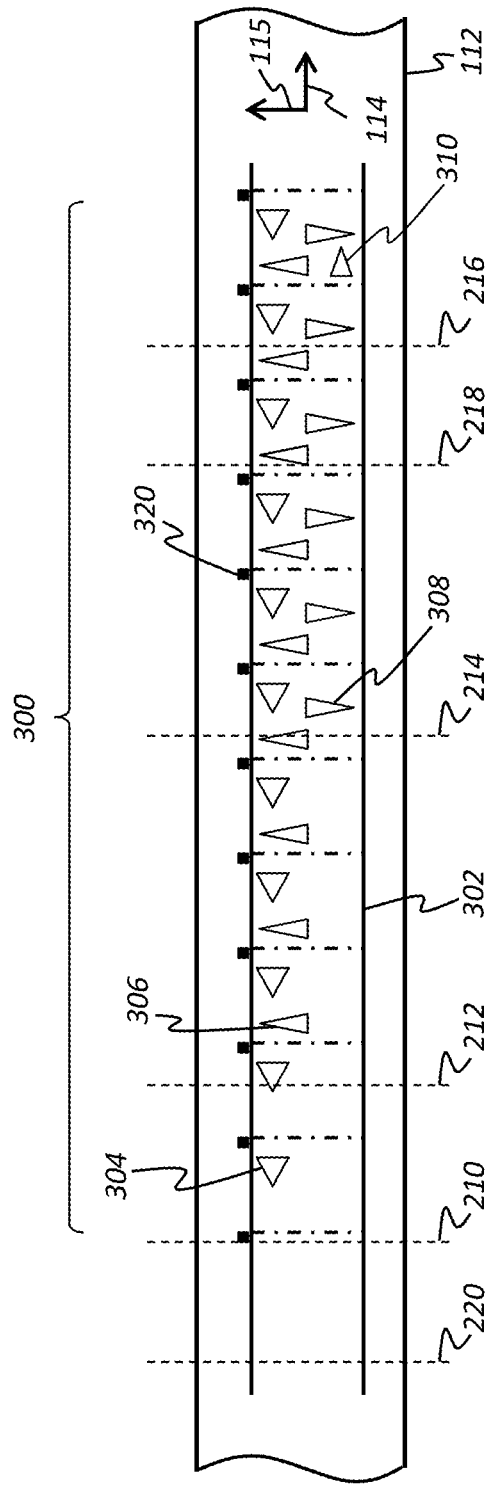
FIG. 6 illustrates a portion of a print job including a number of documents printed without gaps between documents.

This method for adjusting the in-track registration works effectively when there are unprinted gaps 312 between the document pages 302a, 302b. However, there is a need for sequentially printing document pages in which there is not a gap between sequential document pages 302a, 302b. FIG. 6 shows a portion of a printed web of print medium 112 with a sequence of consecutive document pages 302 printed on it with no gaps between the document pages 302. Such printing without gaps is commonly referred to as "continuous printing" or "continuous print." Examples of continuous print applications include décor printing such as wall paper or the printed layer of laminate flooring or laminate countertops. Other examples include packaging materials, such as wrappers or shrink film labels for bottles or other packages, where it is desirable to have a single cut between the wrapper or label for one product and the next. Phantom line show where cuts might be made between wrappers or to show the repeat length for a décor printing application.

Figure 7:
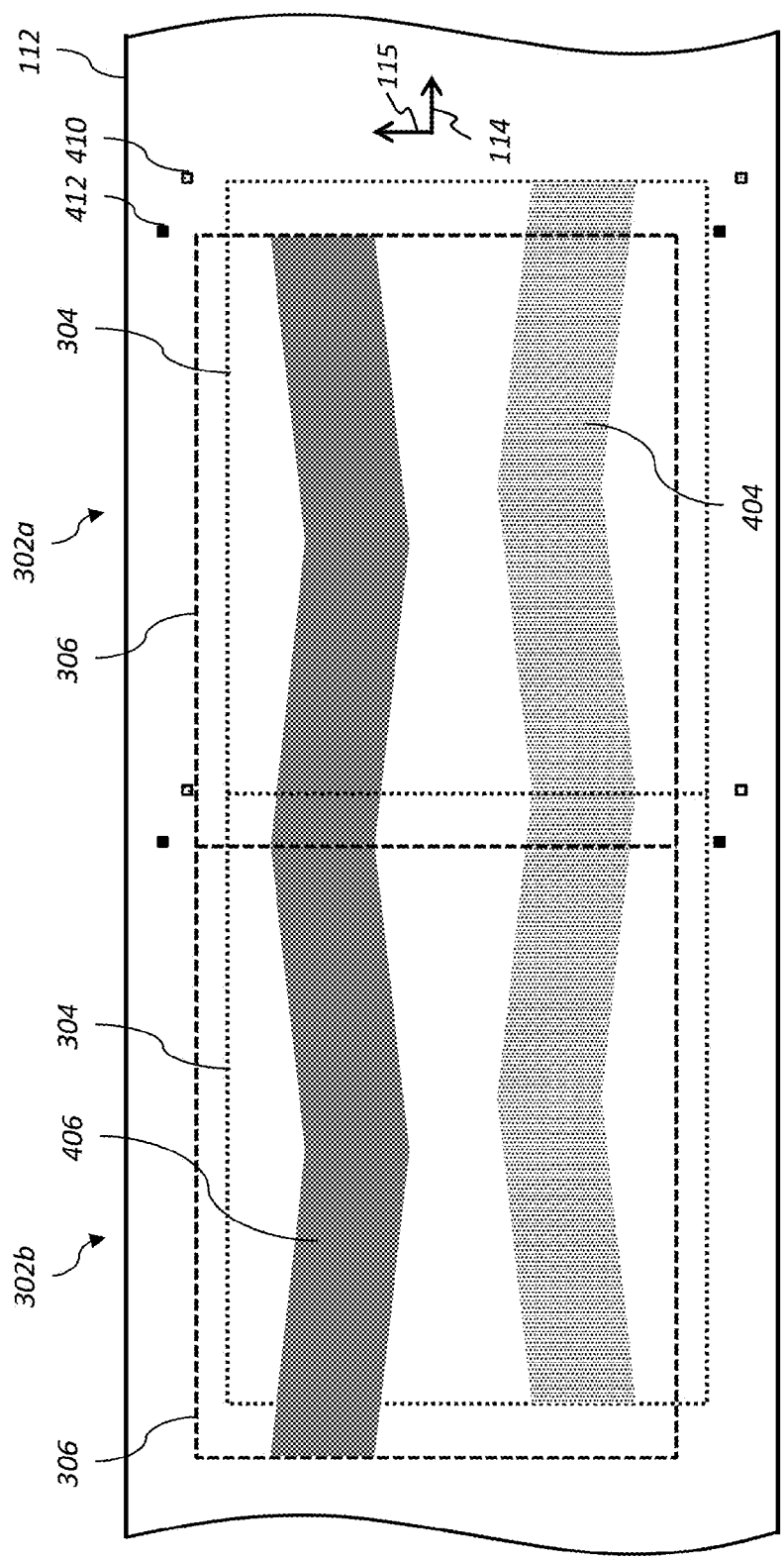
FIG. 7 illustrates a close up portion of a print job including a number of documents printed without gaps between documents where the image planes are misregistered.

FIG. 7 shows an enlarged view of a portion of the print medium 112 showing two image planes 304, 306 for two consecutive document pages 302a, 302b printed with no gap between the document pages 302a, 302b. In this figure, and the following figures, only two document pages 302a, 302b and two image planes 304, 306 are shown for clarity, but it should be recognized that the invention is applicable where an indefinite number of document pages 302 are printed and in which two or more image planes 304, 306 are to be registered. The perimeter of the image planes are shown as dotted lines. Pattern 404 corresponds to the image content of the reference image plane 304, and pattern 406 corresponds to the image content of the non-reference image plane 306. As was done with FIG. 5, the non-reference image plane 306 has been shifted in the cross-track direction 115 to enable the separate image planes 304, 306 to be more clearly identified. The non-reference image plane 306 is misregistered in the in-track direction 114 relative to the reference image plane 304, with the non-reference image plane 306 lagging behind the reference image plane 304. Each image plane 304, 306 has associated registration marks 410, 412. Registration marks 410 are associated with the reference image plane 304, and registration marks 412 are associated with the non-reference image plane 306. In this figure, consecutive document pages 302a, 302b are identical, such as in the printing of the repeated pattern of a wall paper, however the invention is also applicable where the image content varies from page-to-page.

In continuous print applications, each of the image planes 304, 306 of each document page 302 starts printing when the corresponding image plane 304, 306 of the previous document page 302 finishes printing, so that there is no gap between the document pages 302. In some embodiments, the data stream for each image plane 304, 306 includes an End Of Page (EOP) command or character. As the printing system 100 (FIG. 1) encounters the EOP character while printing each image plane 304, 306, the EOP character serves as a cue signal to initiate the printing of the corresponding image plane 304, 306 of the next document page 302. In an alternate embodiment, the number of pixel rows in the image planes 304, 306 are identified. The printing of an image plane 304, 306 of the next document page 302 is initiated with the identified number of pixel rows of the corresponding image plane 304, 306 of the previous document page 302 has been printed.

In an exemplary embodiment, registration errors in the printed document pages 302a, 302b are measured by using a digital image capture system such as quality control sensor 110 (FIG. 2) to capture a digital image of the printed document pages 302a, 302b. The captured digital image is then analyzed to characterize the registration errors.

In some embodiments, the analysis can include determining positions of the registration marks 410, 412. The registration errors can then be determined based on a difference between the positions of the registration marks 410 in the reference image plane 304 and the positions of the registration marks 412 in the non-reference image plane 306. The position difference in the in-track direction provides an indication of the in-track registration error and the position difference in the cross-track direction provides an indication of the cross-track registration error. For cases where the registration marks 410, 412 are intended to be coincident when the image planes 304, 306 are properly registered, the difference in the positions of the registration marks 410, 412 provide a direct indication of the registration error. In other cases, the registration marks 410, 412 are nominally separated by a predefined distance. In such cases, the measured distance between the positions of the registration marks 410, 412 must be compared to the expected nominal distance in order to estimate the misregistration.

In other embodiments, the registration errors can be determined based on an analysis of the image content in the image planes 304, 306 rather than relying on registration marks. For example, if nominal relative positions of features in the image planes 304, 306 are known, the analysis can include determining the actual relative positions of the features and comparing them to their nominal relative positions in order to characterize the registration errors. In some embodiments, the analysis methods described in commonly-assigned U.S. Patent Application Publication No. 2015/0116734 (Howard et al.), which is incorporated herein by reference, can be used to analyze the captured digital image to determine the measured registration errors.

In-track magnification errors can be measured by comparing the positions of registration marks 410, 412 which are spaced apart at different locations in the in-track direction (e.g., at the beginning and end of a particular document page 302a). Likewise, cross-track magnification errors can be measured by comparing the positions of registration marks 410, 412 which are spaced apart at different locations in the cross-track direction (e.g., along the left and right edges of the print medium 112).

Figure 8:
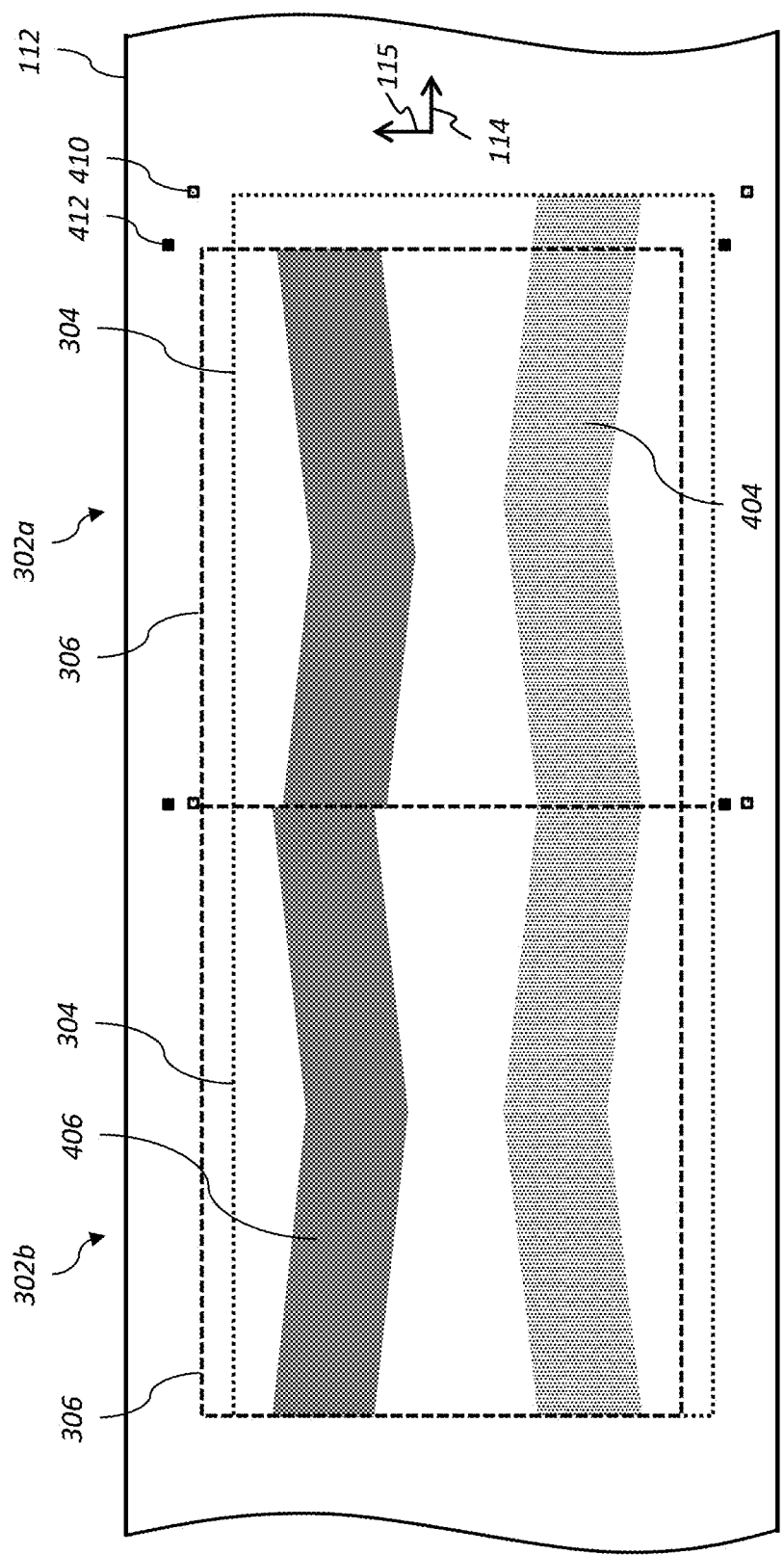
FIG. 8 illustrates conventional in-track registration adjustments when printing without gaps between documents.

FIG. 8 shows a portion of the print medium 112 similar to FIG. 7, but the in-track registration error present in the first document page 302a has been corrected by the adjusting the cue delay of the non-reference image plane 306 to shift forward (i.e., to the right) the starting point of the non-reference image plane 306 to match the starting point of the reference image plane 304 in the second document page 302b. This shifting forward of the starting point of the non-reference image plane 306 of the second document page 302b required the non-reference image plane 306 of the second document page 302b to start before the non-reference image plane 306 of the first document page 302a would have finished printing. The non-reference image plane 306 of the first document page 302a therefore had to be truncated to allow the non-reference image plane 306 of the second document page 302b to start at the desired starting point. An undesirable discontinuity artifact is seen in the image content (i.e., pattern 406) of the non-reference image plane 306 at the boundary between the document pages 302a, 302b.

Figure 9:
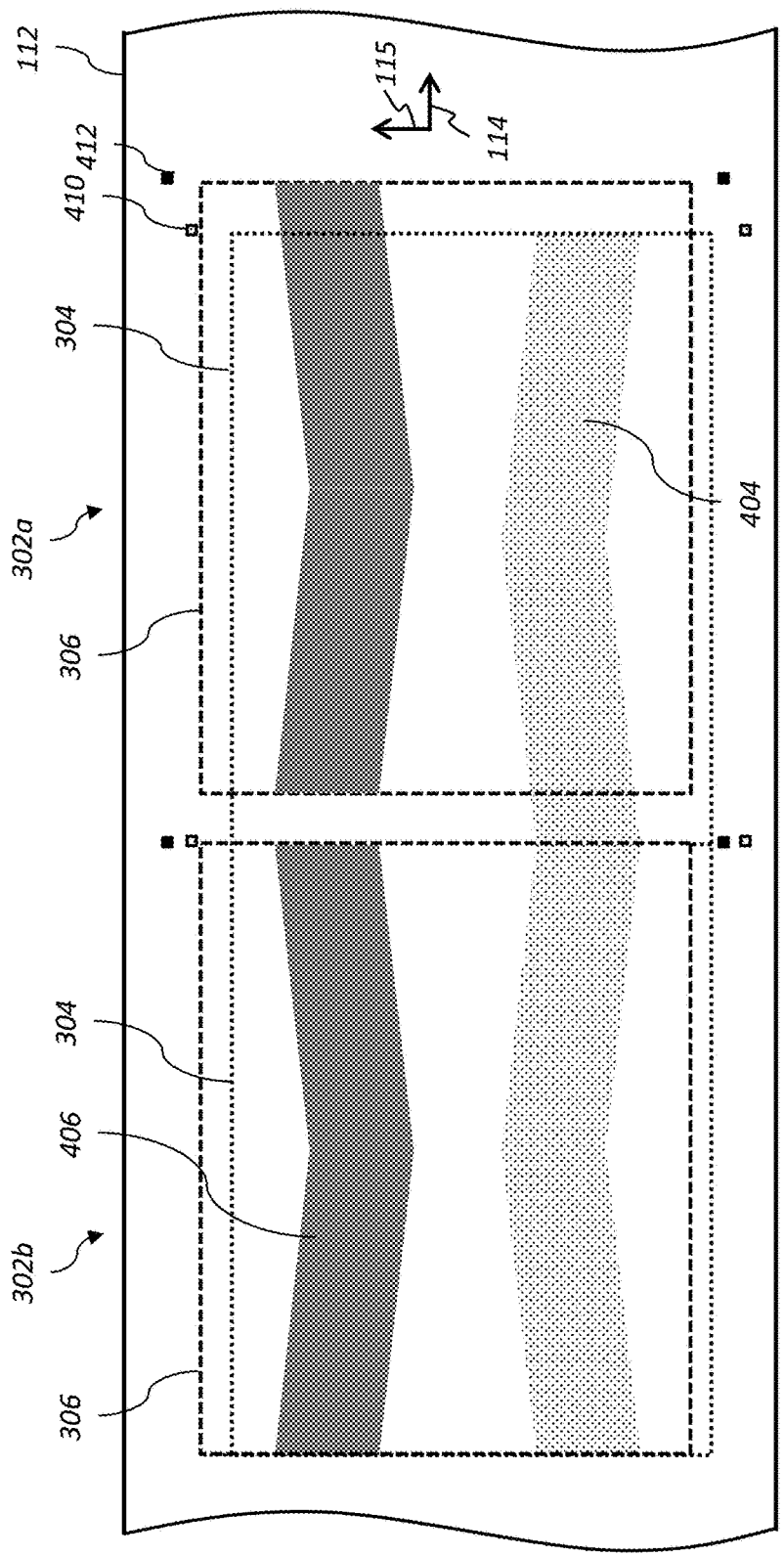
FIG. 9 illustrates conventional in-track registration adjustments when printing without gaps between documents.

FIG. 8 showed the discontinuity that results when the starting point of the non-reference image plane 306 was advanced to improve the color plane registration. On the other hand, FIG. 9 shows the case where the start of the non-reference image plane 306 is delayed to match the starting point of the reference image plane 304. This results in a visible gap artifact between the non-reference image planes 306 of the first and the second document pages 302a, 302b.

Figure 10:
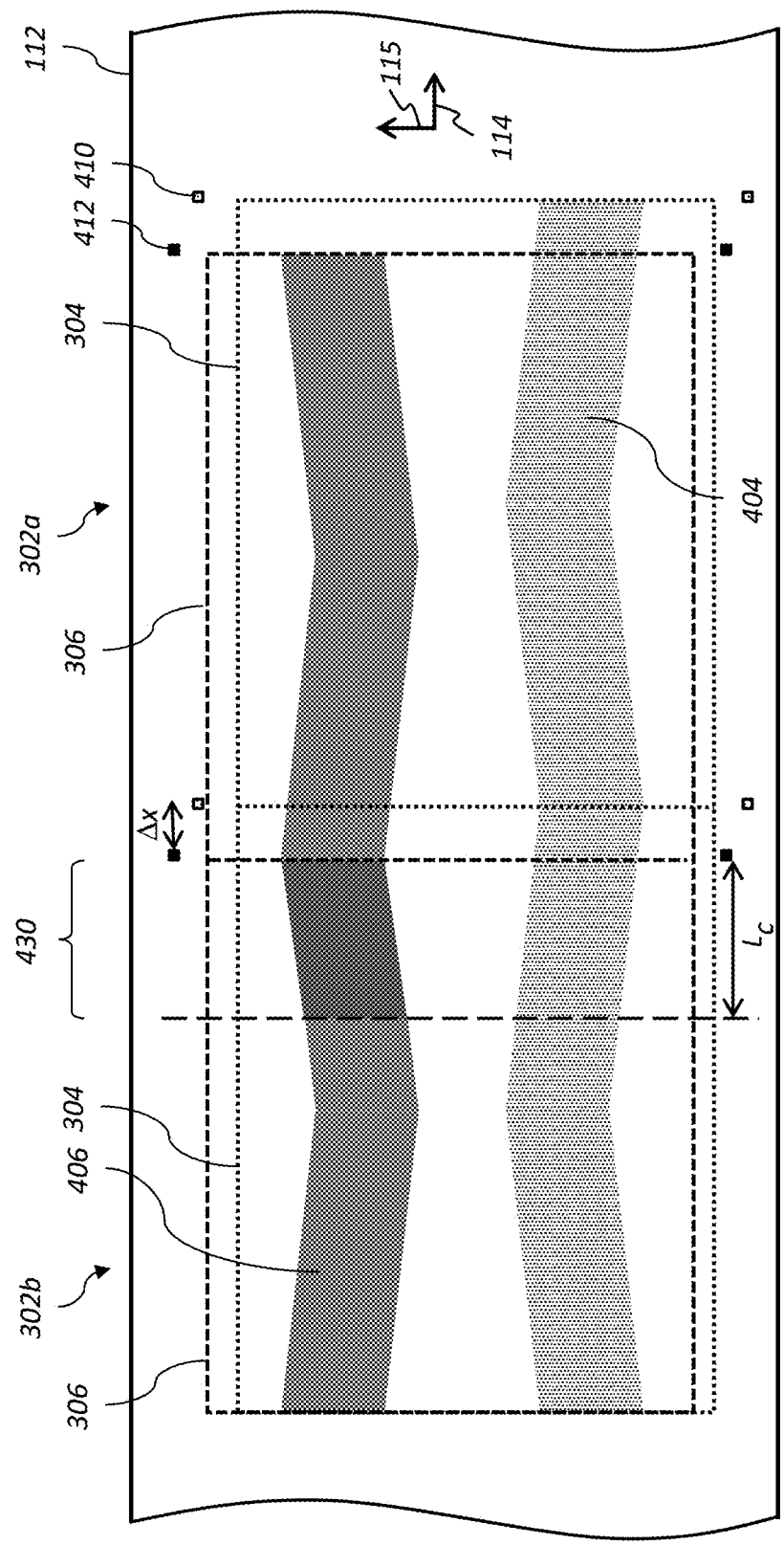
FIG. 10 illustrates an in-track registration adjustment when printing without gaps between documents in accordance with the invention.

FIG. 10 illustrates registration correction in a continuous print application according to an exemplary embodiment of the invention. In this example, the non-reference image plane 306 lags behind the reference image plane 304 and must be shifted forward to bring it back into registration with the reference image plane 304. As shown, the non-reference image plane 306 of the first document page 302a lags behind the reference image plane 304. Rather than truncating the printing of the non-reference image plane 306 of the first document page 302a, the entire image plane 306 of the first document page 302a is printed. The reference image plane 304 and the non-reference image plane 306 of the second document page 302b each begin printing at the end of the corresponding image plane 304, 306 of the previous document page 302a. As the result the starting point for the non-reference image plane 306 still lags behind the starting point of the reference image plane 304 on the print medium 112.

To bring the non-reference image plane 306 into registration with the reference image plane 304, a portion of the non-reference image plane 306 is shrunk (i.e., compressed) in the in-track direction 114. The portion of the non-reference image plane 306 that is compressed in the in-track direction 114 can be referred to as a correction interval 430 of the non-reference image plane 306. Note that while the correction interval 430 in this example is shown along the leading edge of the second document page 302b, this is not a requirement. In other arrangements, the correction interval 430 could be positioned at any desired location within the document page 302b. For example, the end of the correction interval 430 can be positioned to correspond to a trailing edge of the document page 302b.

In some embodiments where there are a plurality of non-reference image planes 306, 308, 310 (e.g., see FIG. 6), the correction intervals 430 for each of the non-reference image planes 306, 308, 310 may or may not be concurrent. For example, the correction interval 430 for the magenta image plane 306 can be set to begin at a document page boundary, while the correction interval 430 for the yellow image plane 308 can be set to conclude a document page boundary. Alternately, the correction interval 430 for the yellow image plane 308 can be positioned to begin once the correction interval 430 for the magenta image plane 306 concludes.

The gradual correction of the registration errors during the correction time interval has the advantage that the position of the image data in the non-reference image plane 306 is gradually adjusted, avoiding the visible discontinuity artifacts that were formed at the boundary between the document pages 302a, 302b in the example of FIG. 8. In an exemplary configuration, the size of the correction interval 430 is about ⅓ inch. However, in other configurations the size of the correction interval 430 can be smaller or larger than this. Preferably, the size of the correction interval 430 is at least 0.1 inches to avoid the formation of artifacts associated with abrupt corrections, and is no more than about 1 inch.

The shrinking or compression of the correction interval 430 of the non-reference image plane 306 is carried out by implementing a temporary reduction in the in-track magnification correction factor (CF) relative to the default in-track magnification correction factor that was in effect prior to the printing of the correction interval 430 of the non-reference image plane 306.

The temporary in-track magnification correction factor is selected such that at the end of the correction interval 430 of the image plane 306, the non-reference image plane 306 is back in registration with the corresponding portion of the reference image plane 304. The temporary in-track magnification correction factor is implemented for a predefined time interval, called a correction time interval ($T_c$), which corresponds to the time required to print the correction interval 430 of the image plane 306, after which the in-track magnification correction factor either reverts to the default value that had been in place prior to the correction time interval or to a new in-track magnification correction factor. If a new in-track magnification correction factor is implemented after the correction time interval, the new correction factor is preferably selected to account for the registration drift of the non-reference image plane 306 relative to the reference image plane 304 that had occurred to produce the registration error that needed to be corrected.

The use of the reduced temporary in-track magnification during correction time interval causes the in-track line spacing between the rows of pixels of the non-reference image plane 306 to decrease slightly in the correction interval 430 relative to the nominal in-track line spacing for the rows of pixels of the non-reference image plane 306 prior to the correction time interval, slightly compressing this first portion of the non-reference image plane 306 in the in-track direction 114. The decreased in-track line spacing is controlled through the selection of the temporary in-track magnification correction factor, and is selected such that at the end of the correction interval 430 the image content of the non-reference image plane 306 will be in registration with the with the corresponding image content of the reference image plane 304.

In some configurations, at the end of the correction time interval the in-track magnification correction factor is returned to its nominal value so that the in-track line spacing reverts to the nominal in-track line spacing that had been in effect prior to the correction time interval. Alternatively, the in-track magnification correction factor can be shifted to a new value, causing the in-track line spacing to shift to a new in-track line spacing. Preferably, the new in-track line spacing is selected to be appropriate so that the non-reference image plane 306 does not again drift out of registration relative to the reference image plane 304.

Consider an example where an analysis of the registration marks 410, 412 at the trailing edge of the first document page 302a indicates that there is in-track misregistration where the non-reference image plane 306 lags the reference image plane 304 by an amount $\Delta x$. If the in-track length of the correction interval 430 is given by $L_c$, then this in-track misregistration can be corrected using a temporary in-track magnification correction given by:

$$M_t = \frac{L_c}{L_c + \Delta x} \quad (1)$$

where $M_t$ is the temporary in-track magnification correction factor. This can be applied by making an adjustment to the in-track magnification error factor CF to provide a temporary magnification correction factor: $CF_t = M_t \times CF$. This will have the effect of reducing the in-track line spacing by a factor of $M_t$ during the correction time interval $T_c$ associated with the correction interval 430.

If the reference image plane 304 and the non-reference image plane 306 had been in alignment at the leading edge of the first document page 302a, it can be concluded that the in-track misregistration of $\Delta x$ resulted from an in-track magnification error $M_x$ given by:

$$M_x = \frac{L_x + \Delta x}{L_x} \quad (2)$$

where $L_x$ is the in-track length of the reference image plane 304. Therefore, after the non-reference image plane 306 has been brought back into registration with the reference image plane 304 at the end of the correction interval 430, it is desirable to adjust the magnification of the non-reference image plane 306 to keep in registered with the reference image plane 304. This can be done by making an appropriate adjustment to the in-track magnification error factor CF to determine a new in-track magnification error factor: $CF' = CF/M_x$. This will have the effect of reducing the nominal in-track line spacing by a factor of $1/M_x$ after the correction time interval $T_c$ associated with the correction interval 430, thereby reducing the likelihood that the non-reference image plane would again drift out of registration following the correction interval.

Figure 11:
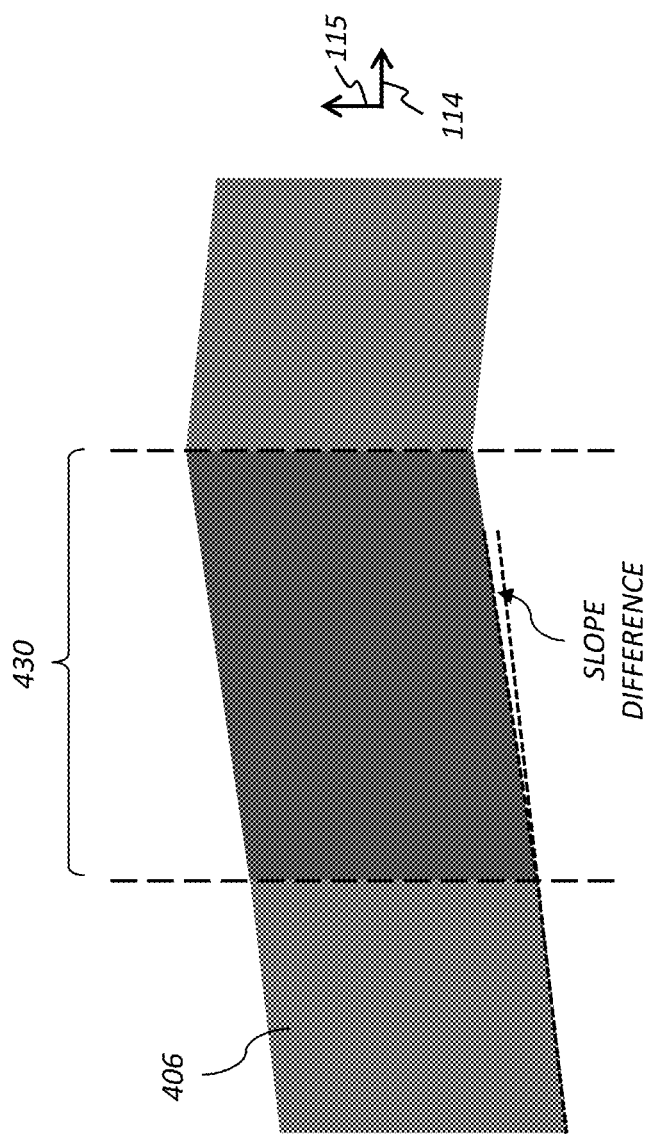
FIG. 11 illustrates a close up view of the in-track registration adjustment of FIG. 10.

While the gradual correction of the in-track registration error avoids the displacement discontinuity artifacts of FIG. 8, the temporary change in the in-track line spacing can produce small discontinuities in the slopes of angled lines at the beginning and the end of the correction interval 430. This is illustrated in FIG. 11 which shows an enlargement of a portion of the pattern 406 in the non-reference image plane 306 including the correction interval 430. Depending on the magnitude of the registration correction, this small slope difference can be visible in certain image features such as printed text strokes. However, the slope discontinuities will generally be is less visible and less objectionable than the displacement discontinuity of FIG. 8. Additionally, the change in the in-track line spacing in the correction interval can also produce a small change in the optical density in the correction interval 430 relative to regions outside the correction interval 430.

The magnitude of the slope change and the change in optical density will depend on the magnitude of the change in the in-track magnification correction factor, which in turn depends on the amount of registration error that must be corrected, and also on the length of the correction interval 430. The longer the correction interval 430, the lower the magnitude of the change in the in-track magnification correction factor. In an exemplary embodiment, the length of the correction interval 430 is about ⅓ of an inch. Longer correction intervals 430 can decrease the change in the slope of the printed strokes and decrease the change in print density. But longer correction intervals 430 will delay the point at which the image planes 304, 306 (FIG. 10) are back in registration. Conversely shorter correction intervals 430 bring the image planes 304, 306 back into registration more quickly, but produce larger print density changes and larger printed stroke slope changes. In an exemplary configuration, the maximum in-track registration correction is limited to about 20% of the length of the correction interval 430 to limit the print density change and the slope change of the printed slopes. In some configurations, the length of the correction interval 430 is selected based on the magnitude of registration correction required, with larger correction intervals 430 being selected for larger required registration corrections. This allows the correction interval 430 to be short for rapid correction of small registration errors, while limiting the visibility of the slope and print density changes.

Figure 12:
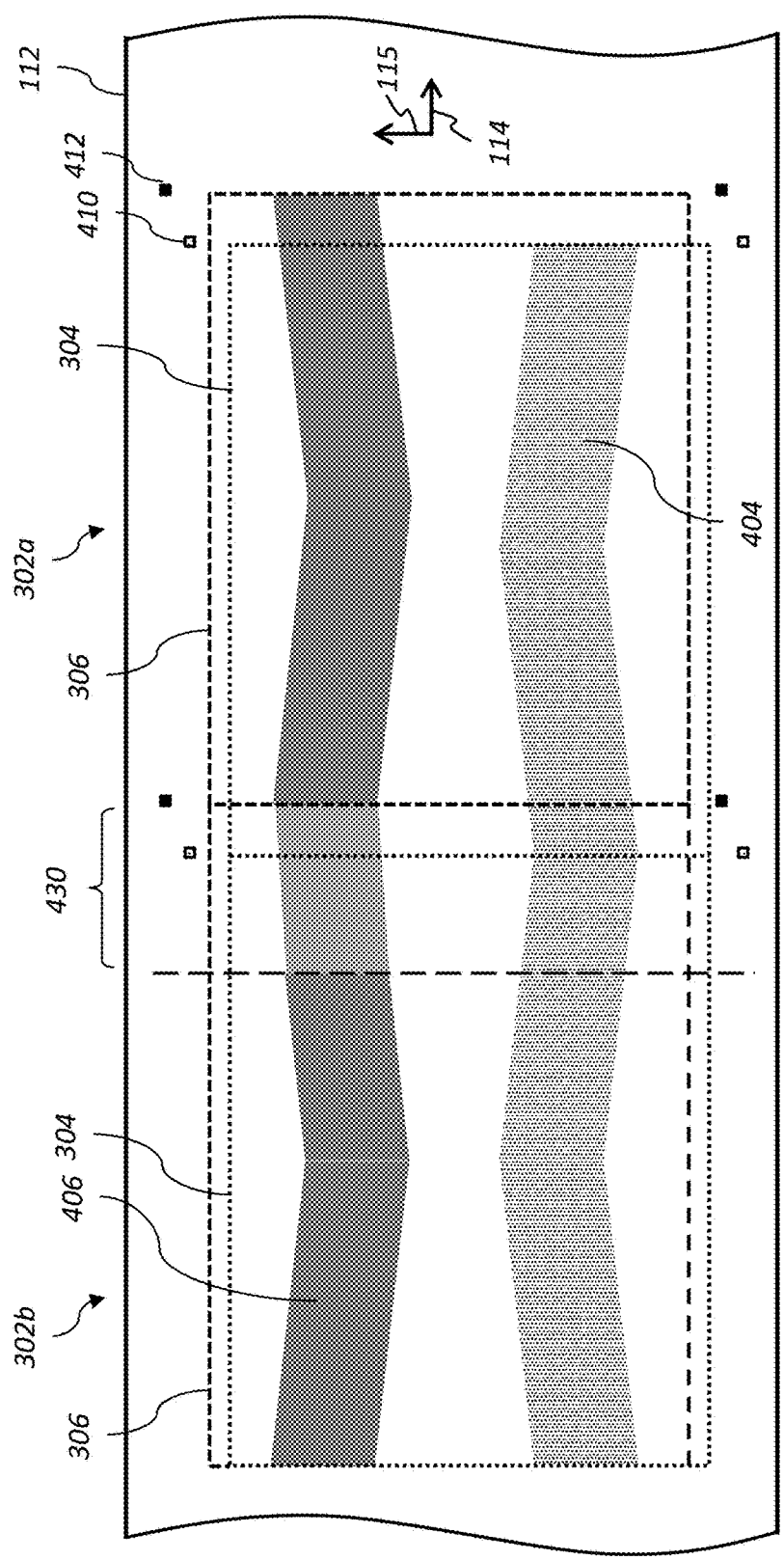
FIG. 12 illustrates another in-track registration adjustment when printing without gaps between documents in accordance with the invention.

FIG. 12 shows a registration correction in accordance with the invention for the case where the non-reference image plane 306 is ahead of the reference image plane 304 and must be shifted backward to move it into registration with the reference image plane 304. The image planes 304, 306 of the second document page 302b each begin printing at the end of the corresponding image plane 304, 306 of the previous document page 302a, so the starting point of the non-reference image plane 306 is printed upstream on the print medium 112 relative to the starting point of the reference image plane 304. To shift the non-reference image plane 306 back into registration with the reference image plane 304, the non-reference image plane 306 is stretched in the in-track direction 114 within the correction interval 430.

The stretching of the non-reference image plane 306 within the correction interval 430 is carried out by implementing a temporary in-track magnification correction factor that is larger than the nominal in-track magnification correction factor that was used previous to the correction interval 430. This produces a temporary small increase in the in-track line spacing relative to the nominal in-track line spacing, thereby stretching the length of the non-reference image plane 306 in the in-track direction 114 within the correction interval 430. The temporary in-track magnification correction factor is selected such that at the end of the correction interval 430, the image content of the non-reference image plane 306 is back in registration with the corresponding image content of the reference image plane 304.

The temporary in-track magnification correction factor is applied for a predefined time interval, called the correction time interval, which corresponds to the time required to print the image data of the non-reference image plane 306 corresponding to the correction interval 430. After the correction time interval, the in-track magnification correction factor (and the corresponding in-track line spacing) either reverts to its nominal value or to a new value. If a new in-track magnification correction factor is implemented after the correction time interval, the new correction factor is preferably selected to reduce the registration drift of the non-reference image plane 306 relative to the reference image plane 304.

As with the previous case discussed relative to FIGS. 10-11, the change in the in-track line spacing at the beginning and the end of the correction interval 430 can produce a small change in the slope of printed strokes as well as a small change of the print density. These artifacts are much less visible than the gap between the non-reference image planes 306 of the first and the second document pages 302a, 302b produced using the conventional method illustrated in FIG. 9.

Figure 13:
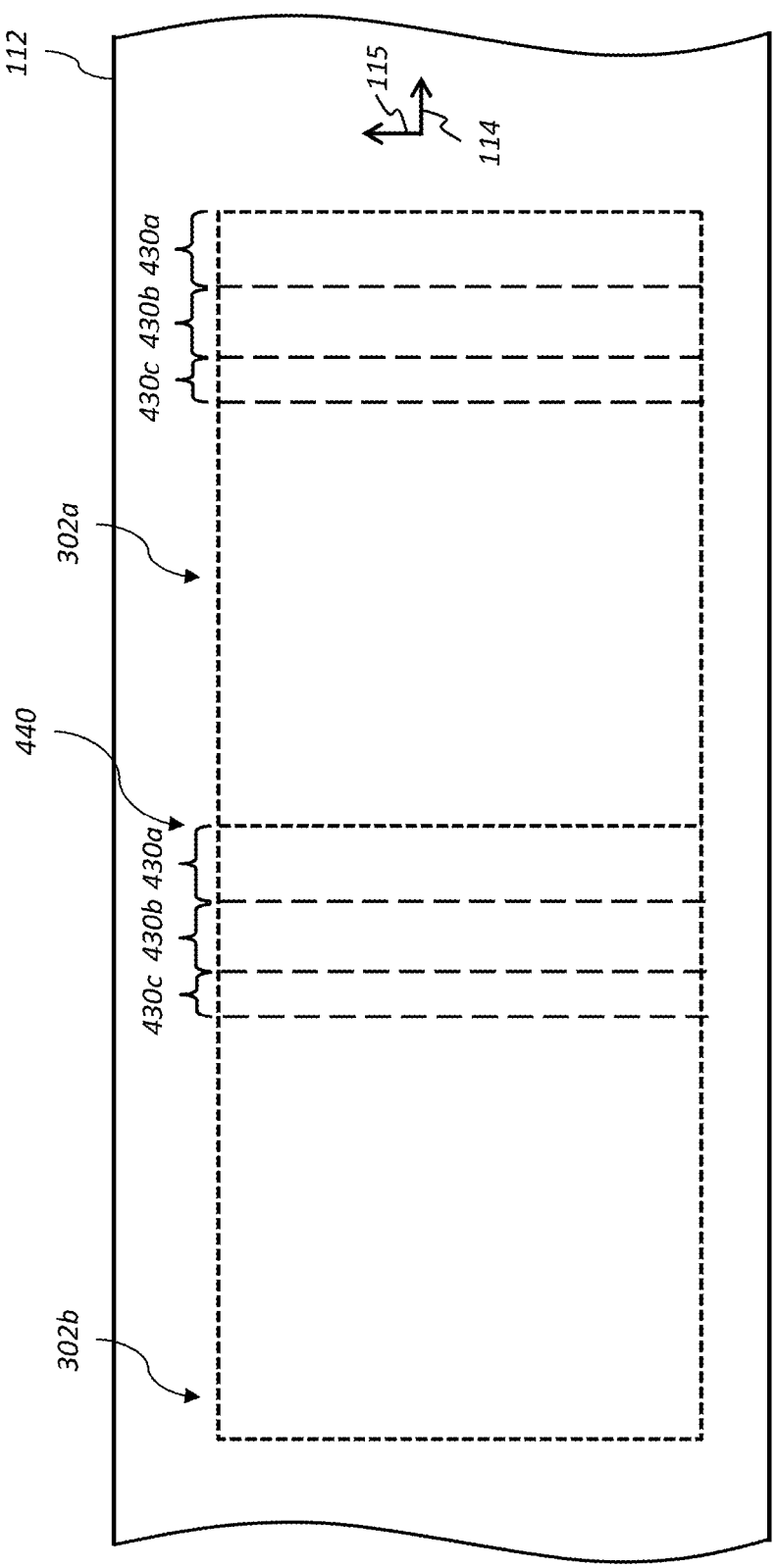
FIG. 13 illustrates a portion of a print job, showing correction intervals for multiple image planes.

As mentioned earlier, the step of temporarily changing the in-track line spacing introduces small changes in the slope of printed strokes and small changes in the print density. To decrease the chance of observing these artifacts, some embodiments stagger the position of the correction intervals 430a, 430b, 430c for the different non-reference image planes 306, 308, 310 (FIG. 6) so that they do not coincide. In the embodiment of FIG. 13, the correction interval 430a for image plane 306 begins at page boundary 440 between the document pages 302a, 302b. When the correction interval 430a for image plane 306 ends, the correction interval 430b for image plane 308 begins, and the correction interval 430b for image plane 308 ends, the correction interval 430c for image plane 310 begins. In other configurations, the correction intervals 430a, 430b, 430c can be spaced apart from each other or they can partially overlap. In the illustrated example, the correction intervals 430a, 430b, 430c are shown as having unequal lengths, although in other configurations they can all have the same length.

In accordance with the registration method of the invention, the in-track line spacing is changed during the pre-defined correction interval 430 relative to the nominal in-track line spacing based on a measured in-track registration error. After the correction interval 430, the in-track line spacing is changed to a new in-track line spacing different from the adjusted in-track line spacing of the correction interval 430. In some cases, the new in-track line spacing can be a return to the original nominal in-track line spacing, while in other cases the new in-track line spacing can be different from either the original nominal in-track line spacing or the adjusted in-track line spacing. In an exemplary configuration, the change in the in-track line spacing at the end of the correction interval 430 does not depend on making a new measurement of the registration errors. The adjusted in-track line spacing is preferably selected to bring the image planes back into registration at the end of the correction interval 430. Therefore, retaining the adjusted in-track line spacing for longer than the correction interval 430 would cause the non-reference image plane 306 to begin drifting back out of registration. The new in-track line spacing that is used after the correction interval 430 is adapted to keep the non-reference image plane 306 in register and serves as a revised nominal in-track line spacing. The new in-track line spacing can be determined independent of acquiring or processing another measurement of the in-track registration errors.

As discussed earlier, there is a need to prevent visually significant artifacts when printing document pages with no intervening gap. The method of the present invention effectively corrects in-track registration errors without forming visible artifacts by providing a means for gradually shifting the in-track registration.

While the examples that have been discussed with respect to FIGS. 6-13 have focused on the correction of in-track registration errors, an analogous approach can be used to correct cross-track registration errors as well without creating visually significant artifacts by gradually shifting the cross-track registration during a cross-track correction time interval. In a preferred embodiment, cross-track registration errors are corrected through a series of one pixel steps in the cross-track position. In one embodiment, the one pixel cross-track registration shifts are spaced apart in the in-track direction by spacings of approximately 0.1 inches, although other spacings can be used. In some configurations, the cross-track registration shifts are staggered from image plane-to-image plane so that the one pixel cross-track registration shifts for the different image planes don't occur at the same in-track locations.

Likewise, cross-track magnification errors can be corrected in a similar fashion by gradually phasing in the magnification changes over a correction interval 430 to prevent any abrupt changes in the cross-track width of the printed image plane. As discussed earlier, cross-track magnification errors can be corrected using various methods including those described in the aforementioned U.S. Pat. Nos. 8,760,712 and 8,845,059 (both to Enge et al.). These methods involve inserting or deleting image pixels across the width of the printheads 106c, 106m, 106y, 106k (FIG. 2) to adjust the size of the printed image in the cross-track direction 115. In a preferred embodiment, the cross-track magnifications errors are corrected through a series of one pixel steps. In an exemplary configuration, single pixels are inserted (or deleted) at locations that are spaced apart in the in-track direction by spacings of approximately 0.1 inches, although other spacings can be used.

One application for continuous printing is the printing of décor such as wallpaper in which a pattern is repeatedly printed without gaps between the patterns. In such applications, it can be useful to store a two-dimensional array of image data corresponding to the repeating pattern in a memory buffer from which it is repeatedly printed to provide a continuous stream of image data. The registration correction process described above is carried out as the image data is retrieved from the buffer memory and subsequently printed.

In some cases, a print job 300 (FIG. 6) may include some document pages 302 that are printed using continuous printing mode with no intervening unprinted gaps, while other document pages 302 may be printed with intervening gaps on one or both sides. The methods described herein will be most useful for correcting alignment errors for those document pages that are not preceded by an intervening gap. However, the methods can also be used even when there are intervening unprinted gaps.

Figure 14:
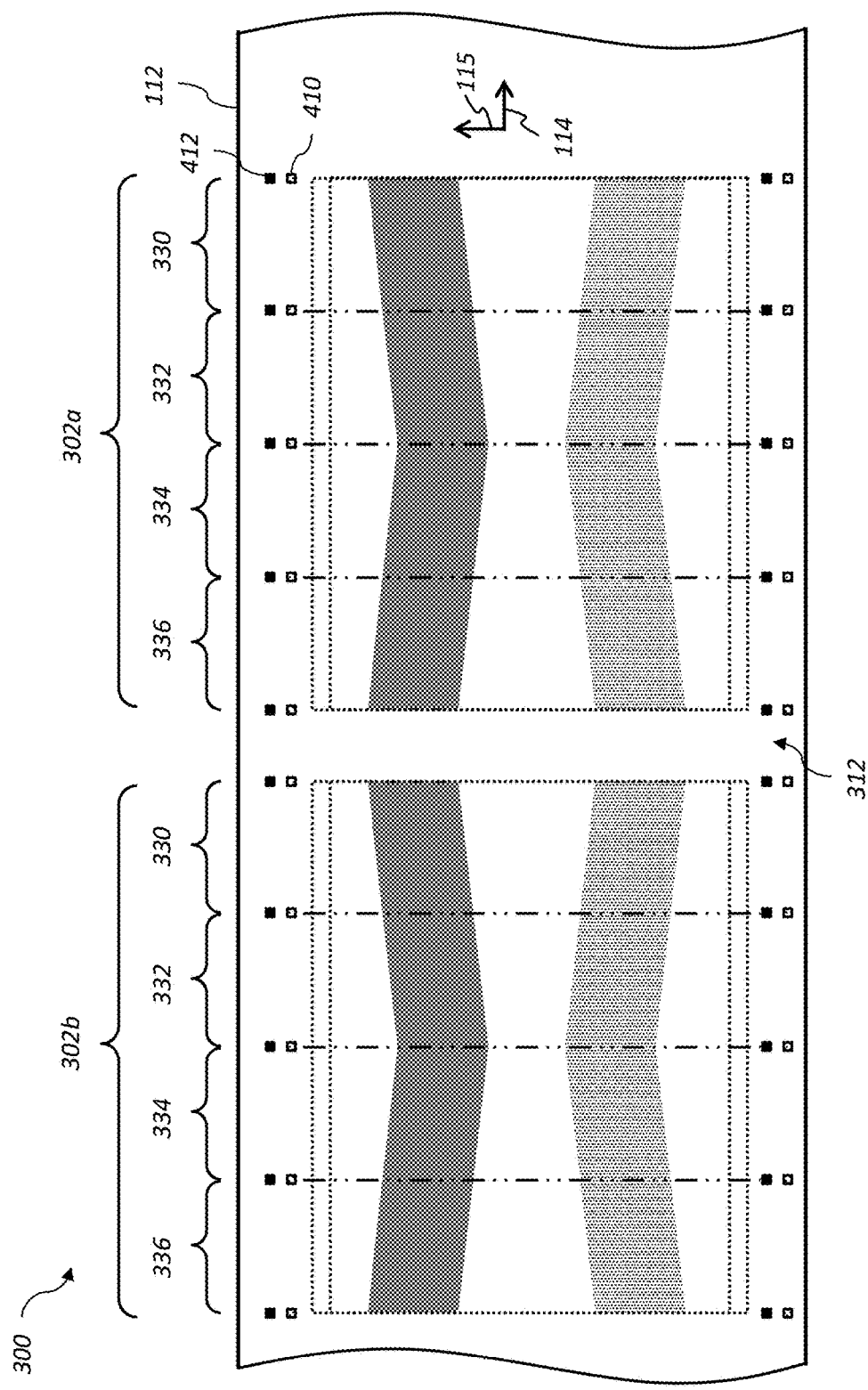
FIG. 14 illustrates a portion of a print job in which document pages are divided into sub-pages that are printed with no intervening gaps.

FIG. 14 illustrates a configuration where a print job 300 includes document pages 302a, 302b that are separated by intervening unprinted gaps 312. A set of registration marks 410, 412 are provided at a series of locations along the in-track direction 114, including locations that are adjacent to the document pages 302a, 302b. In this case, the registration marks 410, 412 can be used to assess the registration errors at intermediate positions within the document pages 302a, 302b. Rather than waiting until the start of the next document page 302a, 302b to correct any registration errors that occur, the above described methods can be used to correct them even while the document pages 302a, 302b are being printed. In one embodiment, the document pages 302a, 302b are divided into a series of sub-pages 330, 332, 334, 336 having boundaries corresponding to the locations of the registration marks 410, 412. The sub-pages 330, 332, 334, 336 can be treated as a series of document pages 302 (FIG. 6) which are printed in a continuous print mode with no intervening unprinted gaps 312. The methods described herein can be used to apply corrections for any registration errors that are detected mid-page without waiting until the next unprinted gap 312. This has the advantage that registration errors are not allowed to accumulate within the document pages 302a, 302b and can corrected before they become large enough to be visible.

Figure 15:
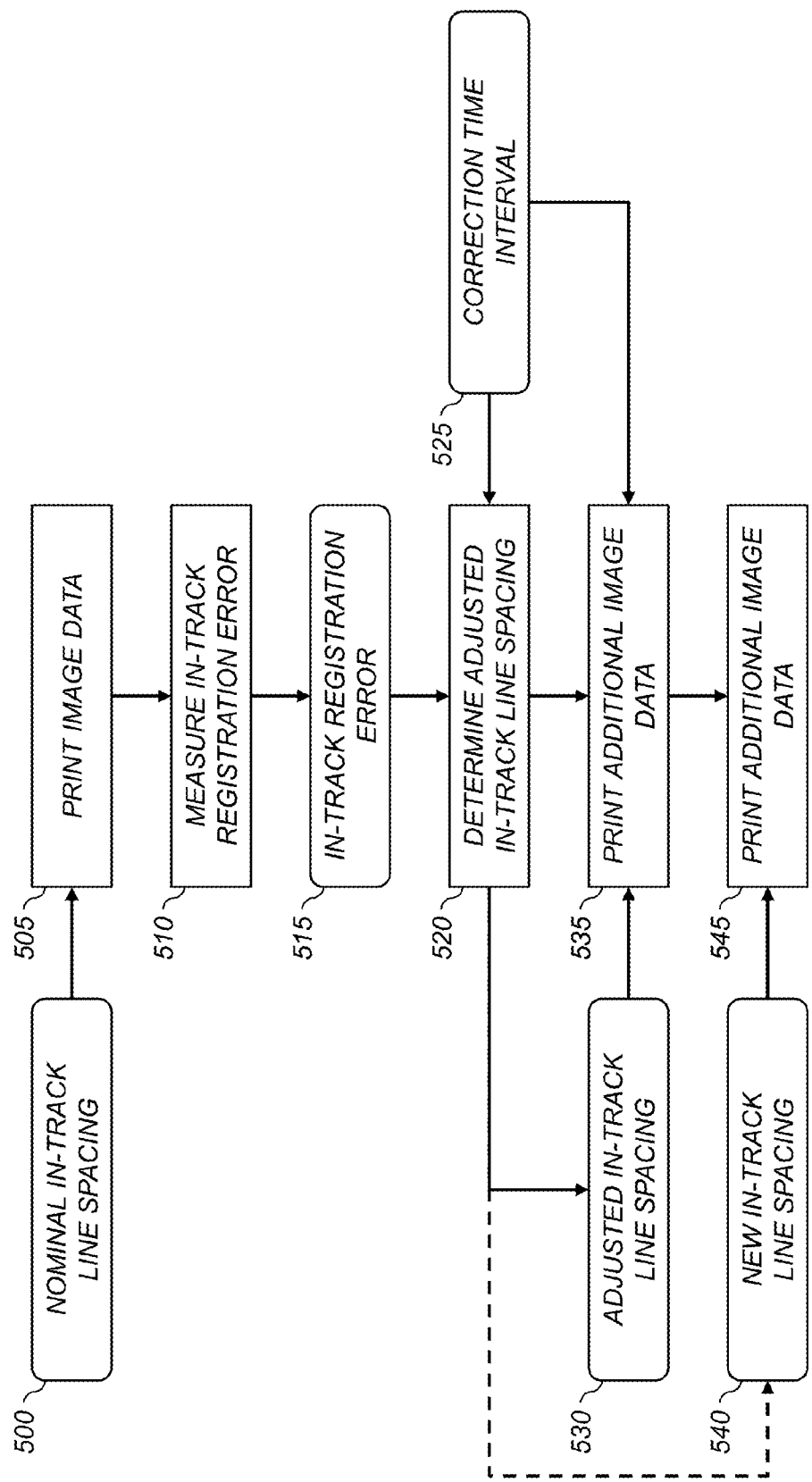
FIG. 15 shows a flowchart of a method for adjusting image registration in a continuous printing application in accordance with the invention.

FIG. 15 shows a flow-chart summarizing a method for correcting registration errors in accordance with an exemplary embodiment. The flow chart describes a process for correcting a particular non-reference image plane 306 (FIG. 10). For cases where there are a plurality of non-reference image planes 306, the method can be used to correct each one of them.

A print image data step 505 is used to print image data wherein lines of image data are printed using a nominal in-track line spacing 500. Generally, the print image data step 505 will involve printing image data for both a reference image plane 304 and at least one non-reference image plane 306.

A measure in-track registration error step 510 is used to measure registration errors, including an in-track registration error 515. The printed image data will typically include a set of registration marks that can be used to determine the registration errors. As discussed earlier, a digital image capture system such as quality control sensor 110 (FIG. 1) can be used to capture a digital image that includes the printed registration marks, and the captured digital image can be used to determine the locations of the printed registration marks in order to assess the amount of misregistration.

A determine adjusted in-track line spacing step 520 is then used to determine an adjusted in-track line spacing 530 that will bring the misregistered non-reference image plane 306 back into registration in the in-track direction over a pre-defined correction time interval 525. A discussion of example calculations that can be used to determine the adjusted in-track line spacing 530 was given earlier.

A print additional image data step 535 is then used to print additional image data during the correction time interval 525, wherein lines of image data are printed using the adjusted in-track line spacing 530.

At the end of the correction time interval 525, the non-reference image plane 306 should be back in registration with the reference image plane 304 in the in-track direction. At this point, a print additional image data step 545 continues to print lines of image data using a new in-track line spacing 540, which is different from the adjusted in-track line spacing 530. In some embodiments, the new in-track line spacing 540 can be equal to the nominal in-track line spacing 500. In an exemplary embodiment, the new in-track line spacing 540 can be a revised nominal in-track line spacing that is determined by the determine adjusted in-track line spacing step 520. Preferably, the revised nominal in-track line spacing is computed based on the in-track registration error 515 to be appropriate to keep the misregistered image plane in registration once it is brought back into registration.

The registration method shown in FIG. 15 can be repeated at various intervals during the printing of a print job 300. For example, if registration marks 410, 412 (FIG. 14) are printed at a series of positions along the in-track direction 114, then the method can be applied each time a set of registration marks 410, 412 are printed.

The invention has been described in detail with particular reference to certain preferred embodiments thereof, but it will be understood that variations and modifications can be effected within the spirit and scope of the invention.

PARTS LIST 100 printing system
102 first printing module
104 second printing module
106c printhead
106k printhead
106m printhead
106y printhead
108 dryer
110 quality control sensor
112 print medium
114 in-track direction
115 cross-track direction
116 turnover module
118 processor
120 storage device
122 encoder
124 cue sensor
126 cue sensor
128 encoder
130 roller
132 roller
160 clock plus stream
170 encoder pulse stream
180 frequency-shifted pulse stream
200 jetting module
202 nozzle array
204 support structure
210 reference line
212 reference line
214 reference line
216 reference line
218 reference line
220 reference line
300 print job
302 document page
302a document page
302b document page
304 image plane
306 image plane
308 image plane
310 image plane
312 unprinted gaps
320 cue mark
330 sub-page
332 sub-page
334 sub-page
336 sub-page
404 pattern
406 pattern
410 registration mark
412 registration mark
430 correction interval
430a correction interval
430b correction interval
430c correction interval
440 page boundary
500 nominal in-track line spacing
505 print image data step
510 measure in-track registration error step
515 in-track registration error
520 determine adjusted in-track line spacing step
525 correction time interval
530 adjusted in-track line spacing
535 print additional image data step
540 new in-track line spacing
545 print additional image data step
$L_c$ in-track correction interval length
$P_{encoder}$ encoder period
$P_{shift}$ frequency-shifted period
$\Delta x$ in-track misregistration

The invention claimed is:

1. A method for correcting image plane registration errors for a multi-channel printing system that prints on a continuous web of media using a plurality printheads which each print lines of image data, comprising:

receiving image data for a plurality of image planes;
defining a nominal in-track line spacing for each of the printheads;
printing the image data using the multi-channel printing system to provide a printed image on the web of media, wherein lines of image data for each image plane are printed using an associated printhead operating at its associated nominal in-track line spacing;

measuring an in-track registration error for a misregistered image plane in the printed image;

determining an adjusted in-track line spacing for the misregistered image plane responsive to the measured in-track registration error that will bring the misregistered image plane back into registration in the in-track direction over a predefined correction time interval;

determining a new in-track line spacing for the misregistered image plane for use in printing lines of image data after the correction time interval, the new in-track line spacing being different from the adjusted in-track line spacing; and printing additional image data using the multi-channel printing system, wherein:

during the correction time interval, lines of image data for the misregistered image plane are printed using the adjusted in-track line spacing; and after the correction time interval, lines of image data for the misregistered image plane are printed using the new in-track line spacing.

2. The method of claim 1, wherein the new in-track line spacing is different from the nominal in-track line spacing for the misregistered image plane.

3. The method of claim 2, wherein the new in-track line spacing for the misregistered image plane is determined responsive to the measured in-track registration error, the new in-track line spacing for the misregistered image plane being computed to keep the misregistered image plane in registration once it is brought back into registration.

4. The method of claim 1, wherein the new in-track line spacing is equal to the nominal in-track line spacing for the misregistered image plane.

5. The method of claim 1, wherein the multi-channel printing system prints a continuous stream of image data such that there are no unprinted gaps in the printed image on the web of media.

6. The method of claim 5, wherein the continuous stream of image data corresponds to a two-dimensional array of image data which is printed repeatedly with no intervening gap.

7. The method of claim 1, wherein measuring the in-track registration error for the misregistered image plane includes:

using a digital image capture system to capture a digital image of the printed image; and analyzing the captured digital image to determine the in-track registration error.

8. The method of claim 7, wherein the printed image includes registration marks in a plurality of image planes, and wherein the analysis of the captured digital image includes determining positions of the registration marks in the printed image, the in-track registration error being determined based on a difference between an in-track position of a registration mark in the misregistered image plane and an in-track position of a registration mark in a reference image plane.

9. The method of claim 1, further including:

measuring a cross-track registration error for the misregistered image plane in the printed image; and gradually adjusting a cross-track position where the additional image data is printed during a predefined cross-track correction time interval to bring the misregistered image plane hack into registration in the cross-track direction.

10. The method of claim 1, wherein the correction time interval corresponds to the time it takes for the web of media to move a distance of between 0.1 inches and 1 inch.

11. A multi-channel printing system that prints on a continuous web of media, comprising:

a web-transport system that transports the web of media along a web-transport path;

a plurality of printheads, each of which are adapted to print lines of image data on the web of media;

a digital image capture system;

a data processing system; and a storage memory communicatively connected to the data processing system and storing instructions configured to cause the data processing system to implement a method for correcting image plane registration errors, wherein the method includes:

receiving image data for a plurality of image planes;

defining a nominal in-track line spacing for each of the printheads;

controlling the printheads to print the image data to provide a printed image on the web of media, wherein lines of image data for each image plane are printed using an associated printhead operating at its associated nominal in-track line spacing;

using the digital age capture system to capture a digital image of the printed image;

analyzing the captured digital image to determine an in-track registration error for a misregistered image plane in the printed image;

determining an adjusted in-track line spacing for the misregistered image plane responsive to the measured in-track registration error that will bring the misregistered image plane back into registration in the in-track direction over a predefined correction time interval; and determining a revised in-track line spacing for the misregistered image plane for use in printing lines of image data after the correction time interval, the revised in-track line spacing being different from the adjusted in-track line spacing; and controlling the printheads to print additional image data, wherein:

during the correction time interval, lines of image data for the misregistered image plane are printed using the adjusted in-track line spacing; and after the correction time interval, lines of image data for the misregistered image plane are printed using the revised in-track line spacing.

* * * * *